(12) United States Patent
Oumi et al.

(10) Patent No.: US 7,034,277 B2
(45) Date of Patent: Apr. 25, 2006

(54) NEAR-FIELD LIGHT-GENERATING ELEMENT FOR PRODUCING LOCALIZED NEAR-FIELD LIGHT, NEAR-FIELD OPTICAL RECORDING DEVICE, AND NEAR-FIELD OPTICAL MICROSCOPE

(75) Inventors: Manabu Oumi, Chiba (JP); Nobuyuki Kasama, Chiba (JP); Hidetaka Maeda, Chiba (JP); Kenji Kato, Chiba (JP); Yoko Shinohara, Chiba (JP); Takashi Niwa, Chiba (JP); Yasuyuki Mitsuoka, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/124,355

(22) Filed: Apr. 16, 2002

(65) Prior Publication Data

US 2002/0166957 A1 Nov. 14, 2002

(30) Foreign Application Priority Data

Apr. 17, 2001 (JP) ............................. 2001-118543

(51) Int. Cl.
*H01J 3/14* (2006.01)
(52) U.S. Cl. ...................................... 250/216; 250/306
(58) Field of Classification Search ................ 250/234, 250/216, 306–311; 73/105
See application file for complete search history.

(56) References Cited

U.S. PATENT DOCUMENTS

| 5,288,997 | A | * | 2/1994 | Betzig et al. ........... 250/227.26 |
| 5,789,742 | A | * | 8/1998 | Wolff ......................... 250/234 |
| 5,859,364 | A | * | 1/1999 | Toda et al. .................... 73/105 |
| 6,614,742 | B1 | * | 9/2003 | Ueyanagi ..................... 369/118 |
| 2003/0015651 | A1 | * | 1/2003 | Kiguchi et al. .............. 250/234 |

FOREIGN PATENT DOCUMENTS

JP 11265520 9/1999

OTHER PUBLICATIONS

Betzig E et al: "Polarization Contrast in Near-Field Scanning Optical Microscopy" Applied Optics, Optical Society of America, Washington, US, vol. 31, No. 22, Aug. 1, 1992, pp. 4563-4568, XP000292102 ISSN: 0003-6935 * figure 1 * * paragraph 'Experimental! *.

(Continued)

*Primary Examiner*—Thanh X. Luu
(74) *Attorney, Agent, or Firm*—Adams & Wilks

(57) ABSTRACT

A near-field light-generating element has a support member and a minute aperture having a size smaller than the wavelength of incident light provided on the support member so as to produce near-field light in response to incident light directed thereto. The minute aperture has a contour in a given plane with one side lying along a line perpendicular to a direction of polarization of the incident light and an opposite side in the given plane defining an apex.

51 Claims, 20 Drawing Sheets

OTHER PUBLICATIONS

Yatsui T et al: "Highly Efficient Excitation of Optical Near-Field on An Apertured FFiber Probe With An Asymmetric Structure" Applied Physics Letters, American Institute of Physics. New York, US. vol. 71, No. 13, Sep. 29, 1997, pp. 1756-1758, XP000725802 ISSN: 003-6951 *The whole document*.

Kurihara K et al: "Ion-milling method for aperture fabrication GaP probes for near-field optical memory application" Optical Data Storage 2001, Santa Fe, NM USA, Apr. 22-25, 2001, vol. 4342, pp. 304-311, XP0022778269 Proceedings of the SPIE—The International Society for Optical Engineering, 2002, SPIE-Int. Soc. Opt. Eng. USA ISSN: 0277-786X * figures 1,2 * * paragraphs '0002!, '0003! *

* cited by examiner

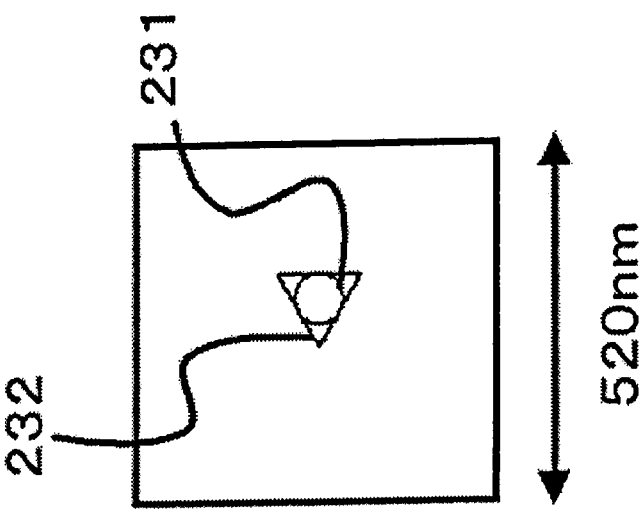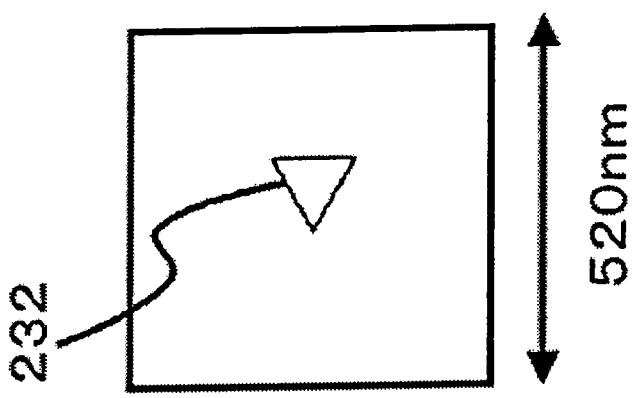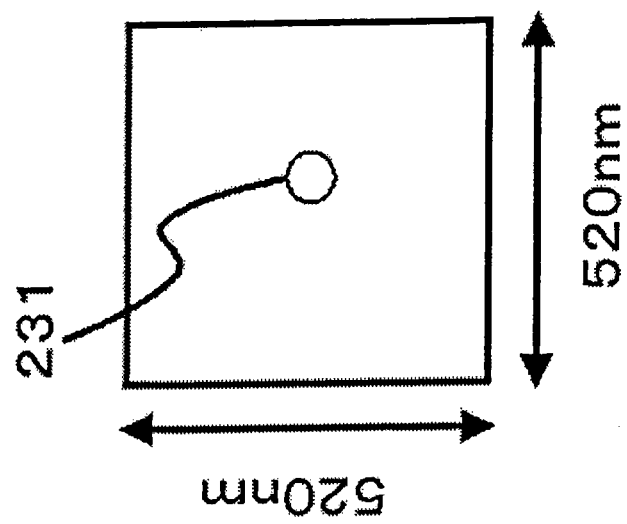

PRIOR ART
FIG. 7A
FIG. 7B
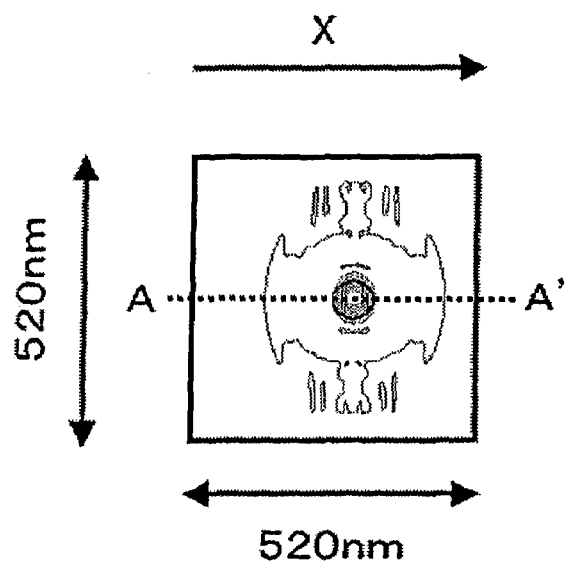
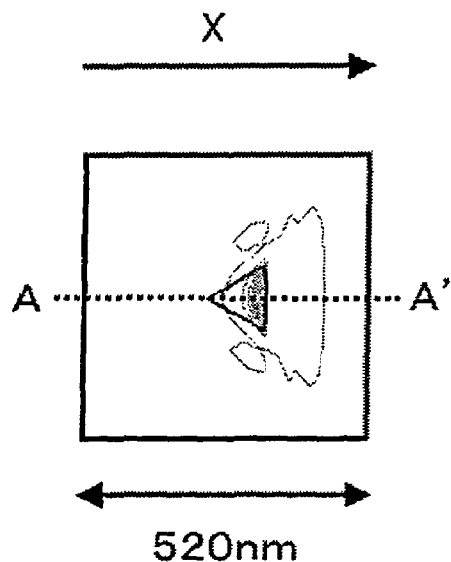
FIG. 8
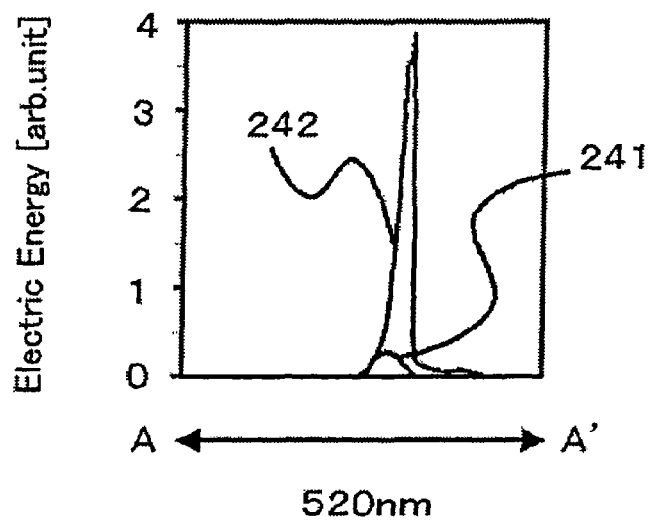

FIG. 12
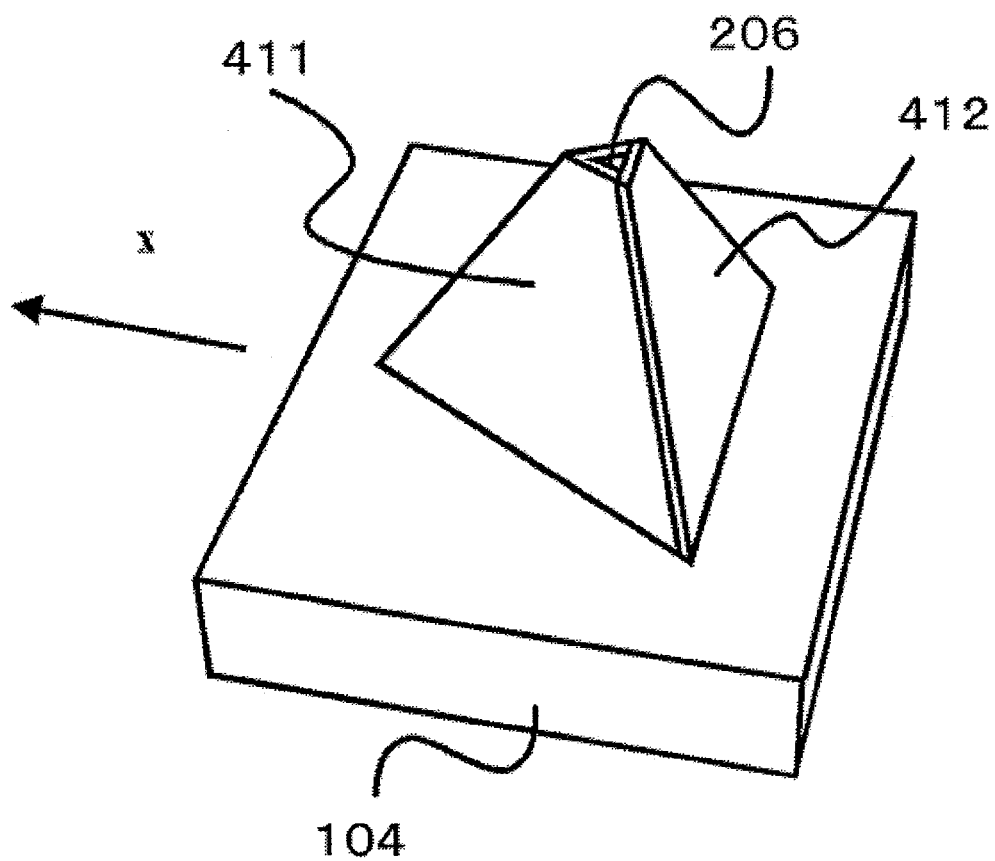
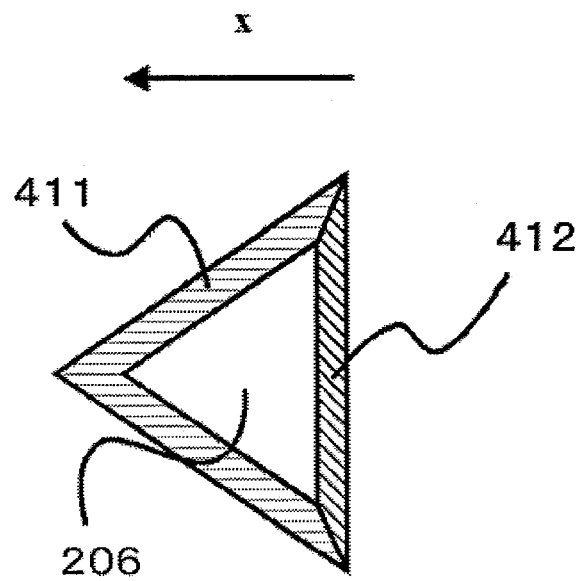
FIG. 13

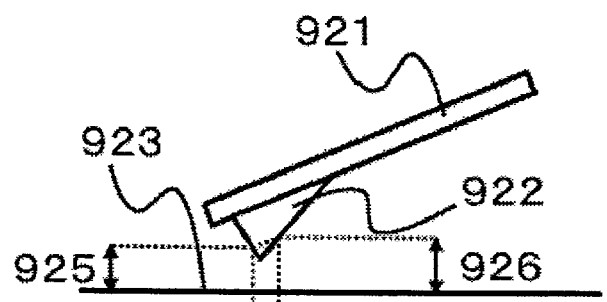
FIG. 21A
FIG. 21B
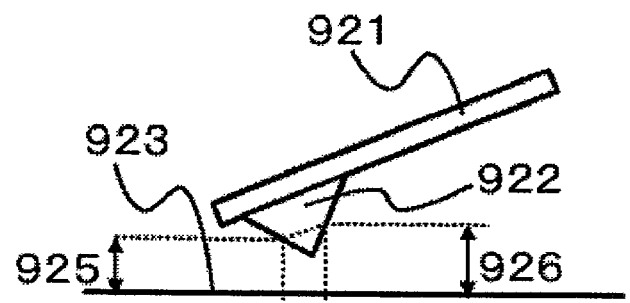
FIG. 22A
FIG. 22B
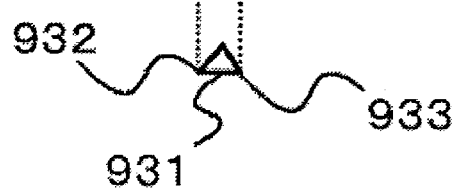

NEAR-FIELD LIGHT-GENERATING ELEMENT FOR PRODUCING LOCALIZED NEAR-FIELD LIGHT, NEAR-FIELD OPTICAL RECORDING DEVICE, AND NEAR-FIELD OPTICAL MICROSCOPE

BACKGROUND OF THE INVENTION

1. Field of the Invention

This invention relates to an element for generating near-field light, a head for a high-density information recording device making use of it, and a probe for a high-resolution microscope.

2. Description of the Related Art

Near-field light-generating elements are used in optical heads within optical recording devices for making high-density information recordings and in optical probes within near-field optical microscopes for making observations at high resolutions.

As amounts of information of still images and moving images have increased explosively in recent years, high-density optical recording devices have been developed actively. It is known that optical disks typified by compact discs (CDs) have limited recording densities due to diffraction limit of light. To exceed this limitation, a method utilizing a shorter wavelength of light and a method making use of near-field light have been proposed. An optical recording device using near-field light is a method consisting of causing light to enter an optically small aperture having a subwavelength size, causing the near-field light spreading a little past the aperture to interact with the surface of the recording medium, and detecting scattered light transmitted or reflected to thereby read out microscopic data marks. Since the minimum mark size capable of being recorded and read is limited not by the wavelength of the incident light but by the size of the aperture, the recording density can be enhanced by fabricating a microscopic aperture.

In an optical recording device employing nearfield light, the aperture is required to be placed close to the surface of the recording medium. Furthermore, to achieve a high data transfer rate, the aperture needs to scan over the surface of the recording medium at a high speed. To satisfy these requirements, a flying head method similar to that used in conventional magnetic recording has been proposed (Issiki, F. et al. Applied Physics Letters, 76(7), 804 (2000)). The head is fabricated by forming a floating slider and a minute aperture on a planar substrate by semiconductor processes. For example, a $SiO_2$ layer is laminated on a Si substrate. A resist pattern for a tip is formed by lithography. The $SiO_2$ layer is etched to fabricate the conical tip made of $SiO_2$. Al is deposited to 200 nm by vacuum evaporation and then the front end of the tip is cut by the FIB (focused ion beam) method. As a result, a tip having an optical aperture at its front end is fabricated. The contour shape of the aperture is determined by the shape of the resist pattern for the tip. To fabricate a microscopic aperture finally, the contour is preferably circular or rectangular. However, a rectangle is not desirable because there is the possibility that the front end becomes like a blade. Where the aperture shape is a circle, it is not necessary to control the direction in handling the head subsequently. Therefore, a circular aperture is normally formed.

An optical probe used in a near-field optical microscope is fabricated by heating, drawing, and cutting an optical fiber, depositing a light-shielding film of Al, and then cutting the front end to form an optical aperture.

Incident light from a laser light source is directed to the aforementioned optical head or probe to thereby produce near-field light. The incident light is guided from the laser by an optical fiber and propagated through air to the microscopic aperture. The light from the laser is linearly polarized light. When the light is being guided by the fiber, the polarization is disturbed. When the light is propagated through air, it is unlikely that the device is so operated that the shape of the aperture, the scanning direction, and the direction of polarization are controlled.

The problem with the aforementioned near-field optical probe or head is that the intensity of near-field light (herein referred to as the light efficiency of the probe) generated from the aperture is small compared with the intensity of the incident light. The incident light is reflected off the inner wall of the probe or absorbed before the light reaches the aperture. Thus, the light is lost as thermal energy. Even with respect to the light reaching the aperture, only small energy can pass through, because the aperture size is smaller than the wavelength. If the intensity of the generated near-field light is weak, sufficient contrast cannot be obtained. In the case of a microscope, the accuracy of the output image will be insufficient. In the case of a data storage device, the data transfer rate will be insufficient.

Contrivances have been made to improve the light efficiency, for example, in Veerman, J. A. et al., Applied Physics Letters, 72(24), 3115 (1998), where the front end of a probe is cut by FIB, the beam is directed to the probe from just beside it to flatten the front end. Conversely, in Ohtsu, M., J. Lightwave Tech., 13(7), 1200 (1995), an attempt is made to improve the resolution by forming a microscopic protrusion within a plane of an aperture.

However, it is known that where the size of the aperture is reduced to improve the resolution of the microscope or the recording density of the storage device, the light efficiency deteriorates. A method of improving the light efficiency is being explored.

SUMMARY OF THE INVENTION

It is therefore an aspect of the present invention to provide a near-field light-generating element having an optically small aperture having a size smaller than the wavelength of incident light, the near-field light-generating element being designed to produce near-field light by directing the incident light to the small aperture. The near-field light-generating element is characterized in that a first side of the outer periphery, or contour, of the small aperture is substantially perpendicular to the direction of polarization of the incident light and a second side opposite the first side is not perpendicular to the direction of polarization of the incident light.

Thus, the first portion of the contour of the small aperture which is substantially perpendicular to the direction of polarization of the incident light produces near-field light of high intensity. Consequently, a high resolution and a high light efficiency are compatible.

It is another aspect of the present invention to provide a near-field light-generating element, wherein the contour is a polygon having one side that is substantially perpendicular to the direction of polarization.

As a result, a high-performance near-field optical head can be fabricated economically simply by fabricating a mask of simple shape. Furthermore, the portion of the contour of the aperture which produces strong near-field light is only one. This permits improvement of the resolution.

It is another aspect of the present invention to provide a near-field light-generating element, wherein the contour is a triangle having one side that is substantially perpendicular to the direction of polarization.

This permits fabrication of a minute aperture based on the triangular shape whose vertex can be readily formed. Stable near-field light-generating elements can be fabricated at high yield.

It is another aspect of the present invention to provide a near-field light-generating element, wherein the minute aperture is formed at the front end of a conical tip that transmits light. Surroundings of the minute aperture are covered with a light-shielding film.

This makes it possible to form a minute aperture having a size smaller than a structure capable of being fabricated by lithography.

It is another aspect of the present invention to provide a near-field light-generating element, wherein one side of the contour is made of a material that excites plasmons by incident light.

As such, the generated near-field light strongly localizes near the one side of the minute aperture. The near-field light-generating element has a high S/N and corresponds to high-density recording.

It is another aspect of the present invention to provide a near-field light-generating element, wherein the material includes any of gold, silver, and copper.

This makes it possible to fabricate a high-performance near-field light-generating element by easy fabrication processes.

It is another aspect of the present invention to provide a near-field optical recording device which comprises an optical head, a light source, a recording medium, means for scanning the optical head across a surface of the recording medium, optical incident means for guiding incident light from the light source to the optical head, and optical detection means for detecting scattered light produced by interaction of the optical head with the surface of the recording medium via near-field light. The device is characterized in that the optical incident means includes means for keeping or controlling polarization of the incident light and in that the optical head is a near-field light-generating element set forth in any one of the above descriptions.

In consequence, the portion of the contour of the aperture that produces strong near-field light is only one. The resolution can be enhanced. Furthermore, a high-performance near-field optical head can be fabricated economically by a simple method. In addition, in a digital storage device, high-density recording and high transfer rate are compatible.

It is another aspect of the present invention to provide a nearfield optical microscope which comprises an optical probe, a light source, optical guiding means for guiding incident light from the light source to the optical probe, and optical detection means for detecting scattered light produced by interaction of the optical probe with the surface of the specimen via near-field light. The microscope is characterized in that the optical quiding means incudes means for keeping or controlling polarization of the incident light and in that the optical probe is a near-field light-generating element as described above.

Thus, only the portion of the contour of the minute aperture which is substantially perpendicular to the direction of polarization of the incident light produces near-field light of high intensity. High resolution and high light efficiency are compatible. High resolution and high S/N of the microscope can be accomplished. A high-performance near-field optical probe can be manufactured economically by a simple method.

It is another aspect of the present invention to provide a near-field optical recording device or a near-field optical microscope, wherein the optical detection means includes a polarizing optical element.

Thus, differences in optically microscopic states on a recording medium or specimen are detected by selectively detecting only certain polarized component of detected light produced by interaction of the recording medium or specimen with the near-field light. Consequently, high-density recording or high-resolution observation can be made.

It is another aspect of the present invention to provide a near-field optical microscope, wherein one location of the contour of the minute aperture which is substantially perpendicular to the direction of polarization of the incident light is located closer to the front end than other portions of the contour in the optical probe.

This makes it possible to place the portion of the contour of the minute aperture, where near-field light strongly localizes, closer to the surface of the specimen. Consequently, a high-resolution microscope can be accomplished.

It is another aspect of the present invention to provide a near-field optical microscope, wherein a line connecting one location of the contour of the minute aperture substantially perpendicular to the direction of polarization of the incident light and a portion opposite thereto is substantially perpendicular to the direction of the front end of the optical probe.

Consequently, only a region of the portion of the contour of the minute aperture that is still closer to the edge can be placed close to the specimen, it being noted that near-field light strongly localizes in the portion. A high-resolution microscope can be accomplished.

BRIEF DESCRIPTION OF THE DRAWINGS

FIG. 6(a) is a view showing a conventional circular minute aperture 231; (b) is a view showing a triangular minute aperture according to the present invention; (c) is a view comparing the shapes and sizes of both;

FIGS. 7A and 7A are diagrams showing the electric field energy distribution at 20 nm just below the minute aperture of FIG. 6;

FIG. 8 is a diagram in which the profiles on line segments A–A' of FIG. 7(a) and 7(b) are shown overlapped;

FIG. 12 is a view showing the vicinities of a minute aperture at the bottom surface of a near-field optical head used in an information recording-and-reading device according to embodiment 3 of the invention;

FIG. 13 is a plan view of the minute aperture shown in FIG. 12;

FIGS. 21A and 21B are views illustrating the manner in which a nearfield optical-generating element according to embodiment 7 of the invention is used as a probe of a nearfield optical microscope;

FIG. 22A–22B are views illustrating the manner in which a near-field optical-generating element according to embodiment 8 of the invention is used as a probe for a nearfield optical microscope.

DESCRIPTION OF THE PREFERRED EMBODIMENTS (Embodiment 1)

Figure 1:
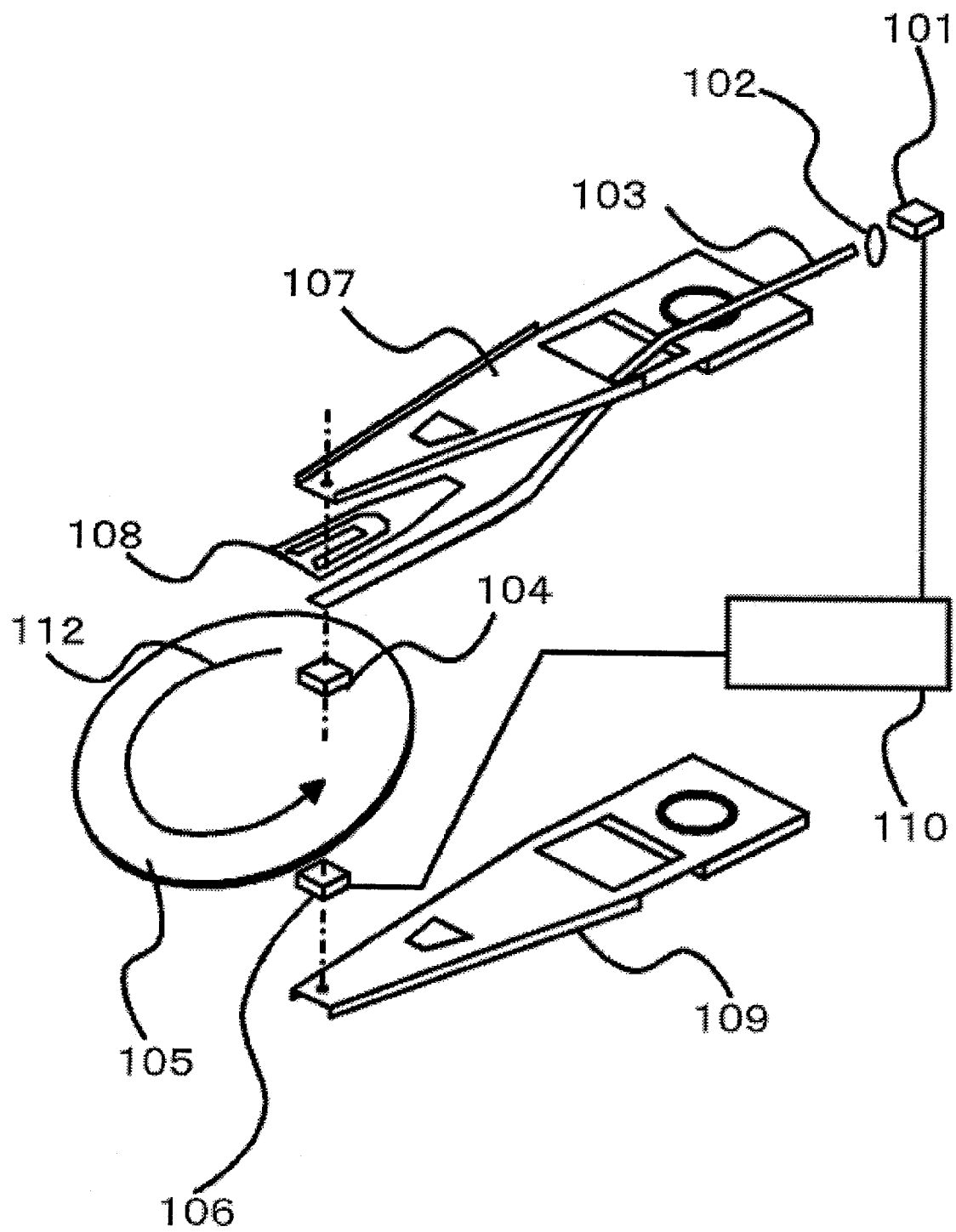
FIG. 1 is a view illustrating the configuration of an information recording-and-reading device of the present embodiment 1.

FIG. 1 is a view illustrating the structure of an information recording-and-reading device of the present embodiment 1. A near-field optical head 104 having a minute aperture (not shown) for producing near-field light is placed at a short distance of tens of nanometers from the surface of a recording medium 105. Under this condition, the recording medium 105 is rotated at a high speed in a direction indicated by the arrow 112. To float the near-field optical head 104 with a constant relative arrangement with the recording medium 105 at all times, a flexure 108 is formed at the front end of a suspension arm 107. The suspension arm 107 can be moved radially of the recording medium 105 by a voice coil motor (not shown).

The near-field optical head 104 is so arranged that the minute aperture is opposite to the recording medium 105. To guide light fluxes from a laser 101 to the near-field optical head 104, an optical waveguide 103 consisting of a core and a clad fixed to a lens 102 and the suspension arm 107 is used. A polarization-maintaining waveguide having a rectangular core cross section is used as the optical waveguide 103 to preserve the direction of polarization possessed by the light fluxes from the laser. If necessary, the laser 101 can be intensity-modulated by a circuit system 110. A light-receiving head 106 for reading information recorded on the recording medium 105 is mounted to a suspension arm 109. The suspension arm 109 is mounted to the voice coil motor (not shown) in the same way as the suspension arm 107.

Figure 2:
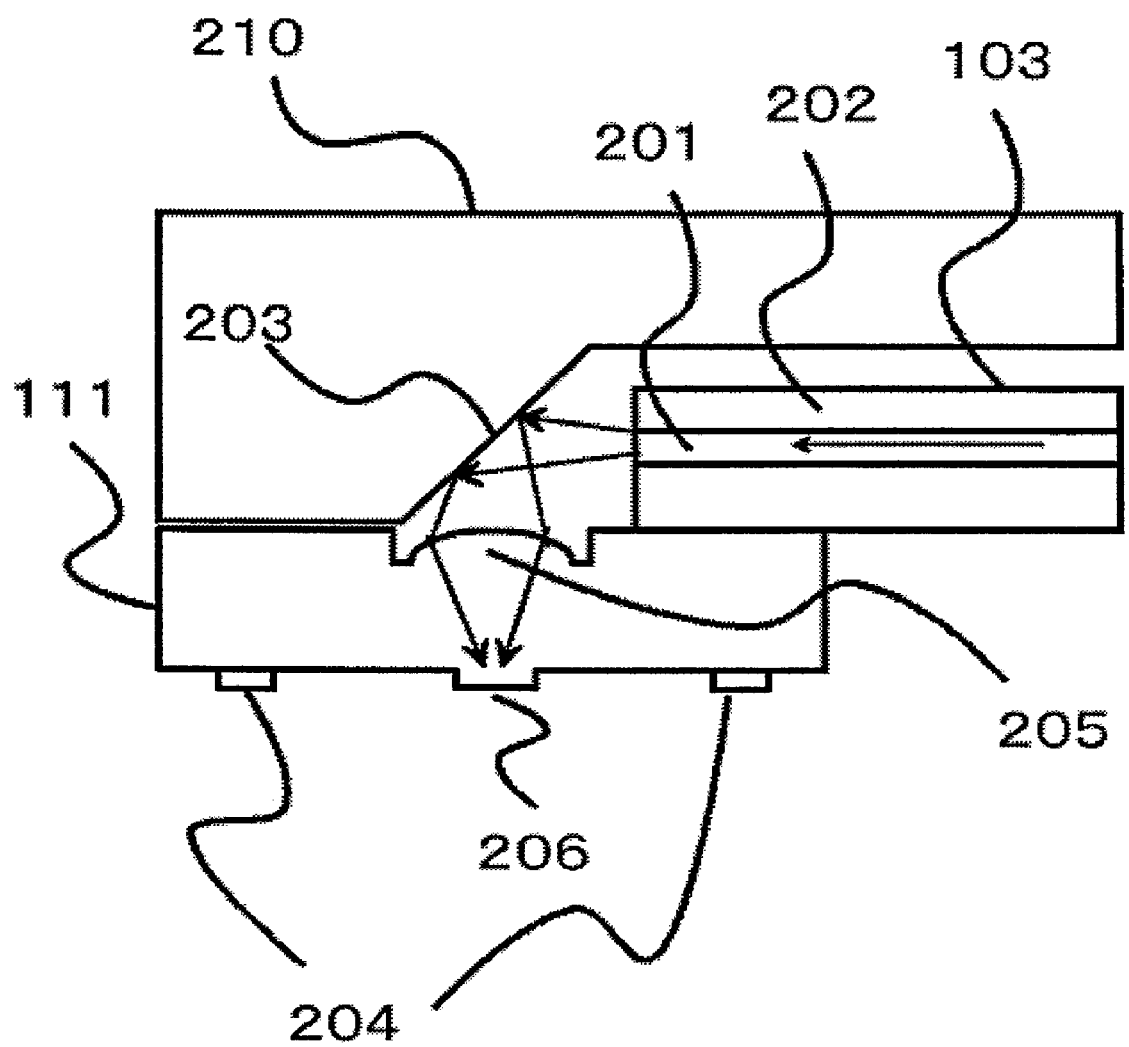
FIG. 2 is a view illustrating a waveguide and a near-field optical head for the information recording-and-reading device of the present embodiment 1.

FIG. 2 is a view illustrating the waveguide and near-field optical head of an information recording-and-reading device according to embodiment 1 of the invention. To realize a lens function for a head, an aperture substrate 111 comprises a transparent glass plate, for example, on which a microlens 205 is formed. An air bearing surface 204 is formed on the side of the recording medium of the substrate to permit floating with a constant relative arrangement. The aperture substrate 111 is coated with a light-shielding film (not shown) except for the microlens 205, the air bearing surface 204, and the minute aperture 206. The light-shielding film at the bottom surface of the aperture substrate 111 is provided with the minute aperture 206. The microlens 205 collects light fluxes from the optical waveguide 103 into the minute aperture 206. A mirror substrate 210 having a mirror surface 203 and the optical waveguide 103 are fixed on top of the aperture substrate 111. Al (not shown) having a thickness of 200 nm is deposited on the mirror surface 203. The optical waveguide 103 consists of a core 201 and a clad 202. In this embodiment, a glass substrate that transmits light of the wavelength of the used laser is used as the aperture substrate 111. Also, the aperture substrate 111 may be made of a material that transmits light of wavelength used only for the microlens 205 and a portion where a light flux transmits, by using a silicon substrate or the like. In addition, an ordinary spherical or aspherical lens, refractive index distribution lens, Fresnel lens, or the like can be used as the microlens 205. Especially, where a Fresnel lens is used, a planar lens can be fabricated. If a lens having a large diameter is fabricated, the thickness of the near-field optical head can be reduced. Fresnel lenses can be mass-produced by using photolithography technology.

Figure 3:
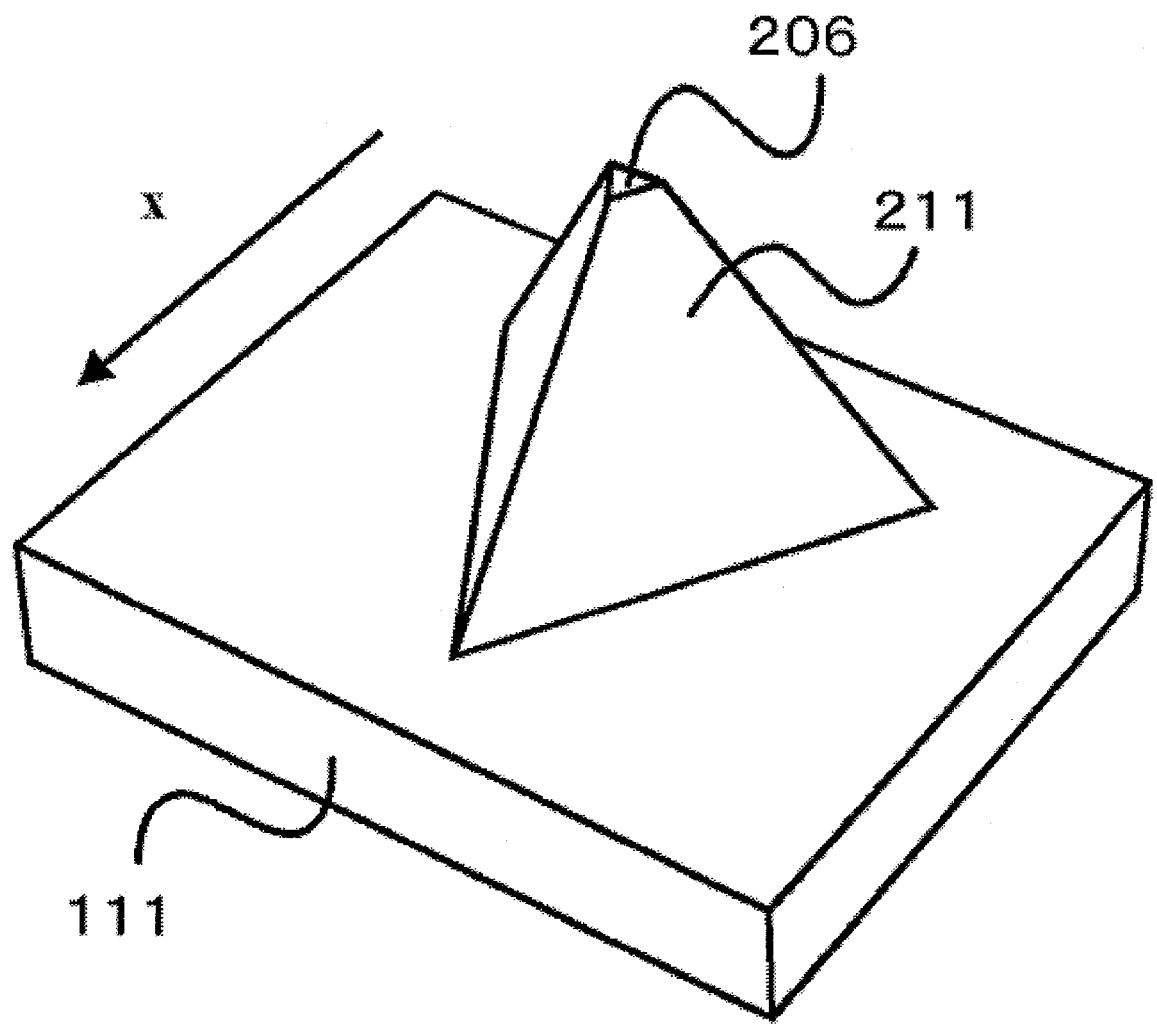
FIG. 3 is a view showing the vicinities of a minute aperture at the bottom surface of the optical head for the information recording-and-reading device of the present embodiment 1.

The present invention is characterized by the portion of the head structure shown in FIG. 2 which is close to the minute aperture 206 and by polarization of the incident light. FIG. 3 is a view showing the vicinities of the minute aperture at the bottom surface of the optical head of the information recording-and-reading device according to the present embodiment 1. A triangular pyramid 211 consisting of SiO$_2$ and having a height of about 10 microns is formed on (bottom surface) of an aperture substrate 111. A light-shielding film (not shown) of Al is formed up to about 200 nm on the surface of the triangular pyramid 211. The vertex of the triangular pyramid 211 is cut by a plane parallel to the bottom surface to remove the light-shielding film. The optically small aperture 206 is formed. Since the triangular pyramid 211 is a regular tetrahedron, the minute aperture 206 has a contour of an equilateral triangle. This head is scanned in a direction indicated by x relative to the surface of the recording medium. Near-field light produced from the minute aperture 206 is made to interact with the surface of the medium.

Figure 4:
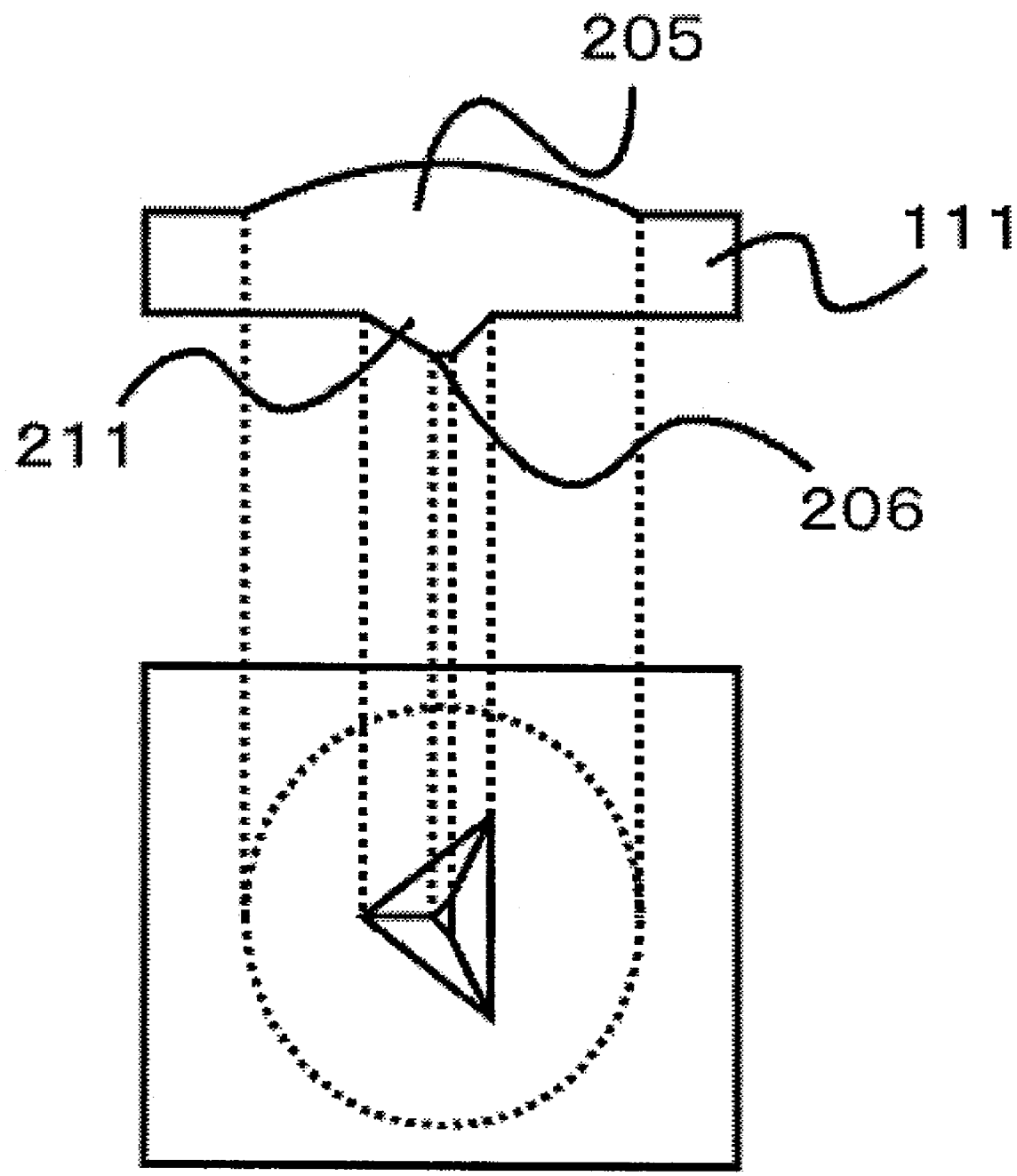
FIG. 4 is a view showing a cross section and the bottom surface of the optical head according to the present embodiment 1.

FIG. 4 is a view showing a cross section through the optical head according to the present embodiment 1 and its bottom surface. The aperture substrate 111 has the microlens 205 on its top surface and the triangular pyramid 211 provided with the minute aperture 206 on its bottom surface.

Figure 5:
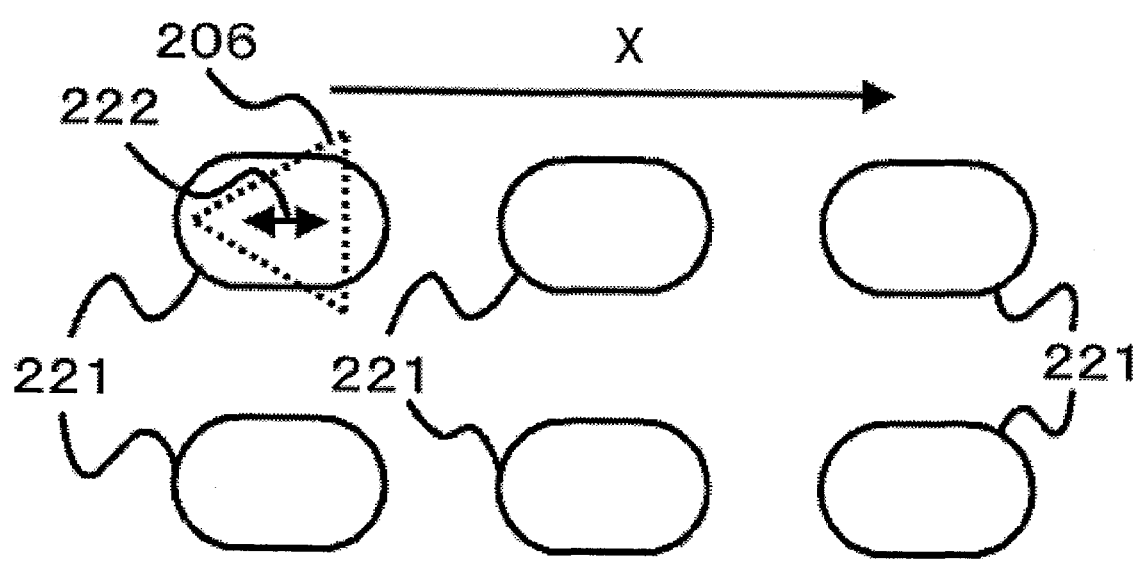
FIG. 5 is a view showing the manner in which the optical head according to the present embodiment 1 scans over a data mark on the surface of a recording medium.

FIG. 5 is a view showing the state in which the optical head according to the present embodiment 1 scans over a data mark on the surface of a recording medium. The data mark, 221, has a length of 72 nm and a width of 56 nm, and is an amorphous area formed on the surface of a phasechange recording material made of $Ge_2Sb_2Te_5$. This is the shortest mark length owing to (1, 7) modulation signal. It corresponds to a recording density of 100 Gb/in². The minute aperture 206 floats at a height of 20 nm above the surface of the recording medium. A constant posture is maintained because the floating force of air generated by rotation of the recording medium at 2.25 m/sec is balanced by the load on the suspension arm 107 shown in FIG. 1. The light incident on the minute aperture 206 has linearly polarized light 222. At this time, the polarized light 222 is vertical to the right side of the minute aperture 206.

Use of the information recording-and-reading device constructed in this way improves the signal intensity by a factor of about 10 and the corresponding recording density by a factor of about 1.5 compared with one having a conventional circular or square, minute aperture and one in which light is made to enter without controlling polarization. This mechanism is described using computer simulation by referring to FIG. 6.

FIG. 6(a) shows a conventional, circular minute aperture 231. FIG. 6(b) shows a triangular minute aperture 232 according to the present invention. FIG. 6(c) is a view comparing the shapes and sizes of both apertures. The circular minute aperture 231 inscribes the triangular minute aperture 232.

FIG. 7 shows the results of the computer simulation performed to find the electric field energy distribution at a location that is 20 nm just under the minute aperture. To indicate the relative position to the aperture, the aperture contours or shapes shown in FIG. 6(a), (b) are shown overlapped. FIG. 7(a) shows the case of the circular minute aperture. FIG. 7(b) shows the case of the triangular minute aperture. The incident light has linear polarization in the X-direction shown in the figure. In the case (a), the energy is distributed over the whole aperture. In the case (b), the energy localizes to the right side of the triangle because light localizes at the edge perpendicular to the direction of polarization.

In FIG. 8, the profiles on lines A–A' of FIGS. 7(a), (b) are shown overlapped. The profile 242 of FIG. 7(b) has an intensity and a full width at half maximum which are 10 times and 0.8 time, respectively as large as those of the profile 241 of (a). It is considered that the cause of the increase of the intensity is that the aperture area of the triangular opening is larger than the circular opening as shown in FIG. 6. It is also considered that localization of the light in the triangular aperture as shown in FIG. 7 has reduced the width of the profile.

The output signal intensity and the recording density can be improved simultaneously be well controlling the polarization of the incident light in practice, shaping the aperture into a triangular form, and placing the polarization of the incident light perpendicular to one side of the triangular aperture.

Figure 9:
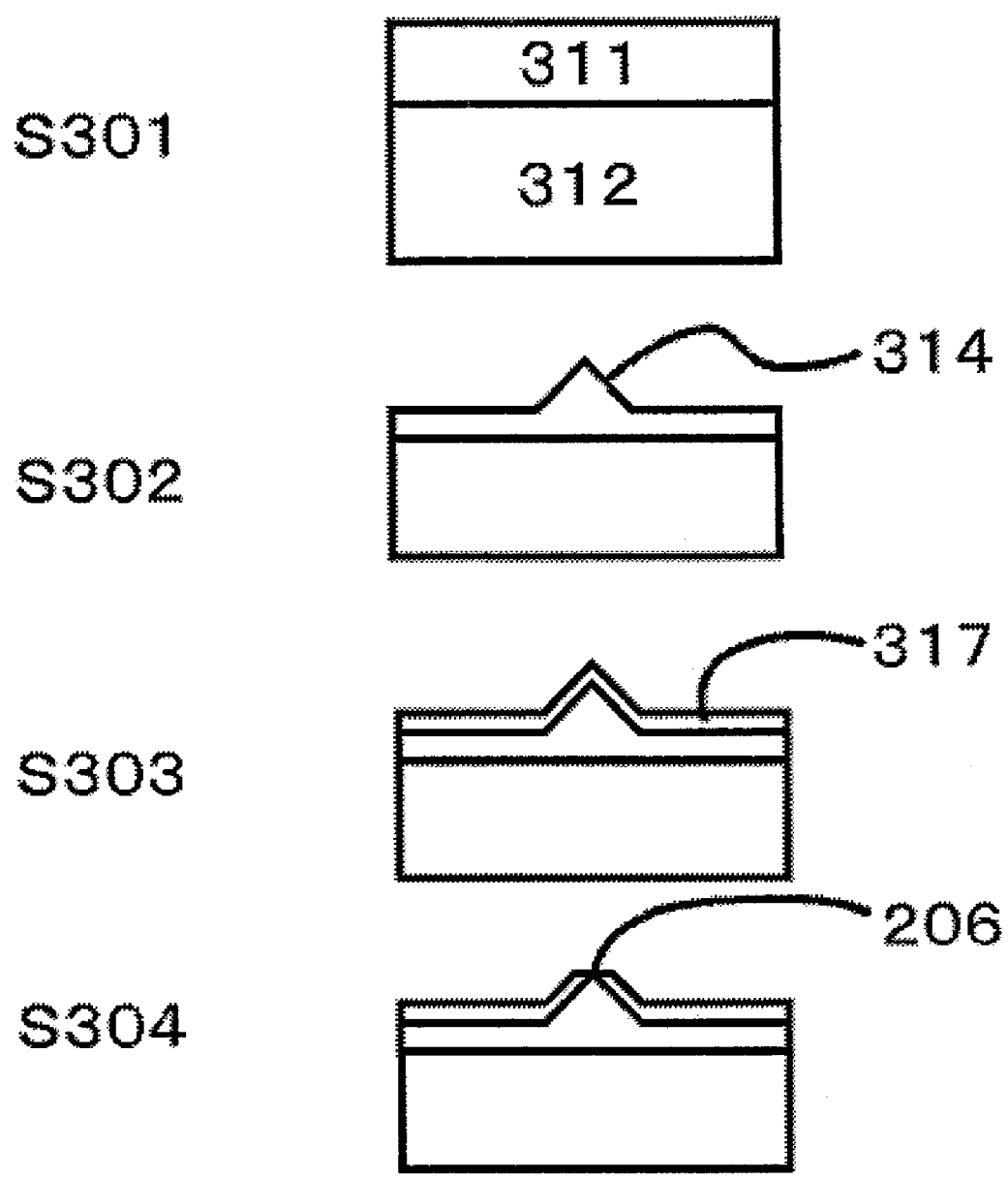
FIG. 9 is a view illustrating a method of fabricating an optical head in the information recording-and-reading device according to the present embodiment 1.

A method of fabricating the triangular pyramid shown in FIG. 3 is described, the method being embraced in methods of fabricating the optical head of the information recording-and-reading device according to the present embodiment 1 of FIG. 9. In step S301, a $SiO_2$ layer 311 having a thickness of 15 microns is formed on the top surface of a Si substrate 312 having a thickness of 400 microns by plasma CVD. In step S302, a shape 314 of a triangular pyramid is formed by isotropic etching, using a triangular-shaped mask patterned by photolithography. Then, in step S303, an Al film 317 is deposited to a thickness of 200 nm by vacuum evaporation. Finally, in step S304, the front end is cut by the FIB (focused ion beam) method and an optically small aperture 206 is fabricated. The minute aperture 206 can be formed without using FIB in step S304 by applying mechanical pressure to remove only a front-end portion of the Al film 317.

This method makes it possible to mass-produce minute apertures 206 as described in the present embodiment 1. Of the head structure shown in FIG. 2, those portions excluding the minute aperture 206 can be fabricated by existing semiconductor processes and assembly techniques. Where they are combined, near-field optical heads or probes according to the present invention can be mass-produced economically by batch processing.

As described thus far, in the information recording and reading device according to embodiment 1, the contour of the minute aperture producing near-field light is substantially a regular triangle. One side thereof is substantially perpendicular to the polarization of the incident light. Therefore, the generated near-field light localizes around it. The opposite side is the tip and does not cause much localization of generated near-field light. Consequently, a near-field optical head having a larger output signal intensity and a larger corresponding recording density can be accomplished than those of a device having a conventional circular aperture or rectangular aperture or a device which has a triangular aperture but in which the polarization of incident light is not well controlled. Furthermore, with respect to the manufacturing method, in the case of the conventional circular aperture, it has been necessary to form a circular cone at a high shaping accuracy. In the case of a rectangular aperture, it has been necessary to form a quadrangular pyramid at a high shaping accuracy. In the case of the triangular aperture in the present embodiment, it suffices to form a triangular pyramid or projection that always stands only on its one vertex. Apertures can be manufactured at improved yield.

Figure 10A:
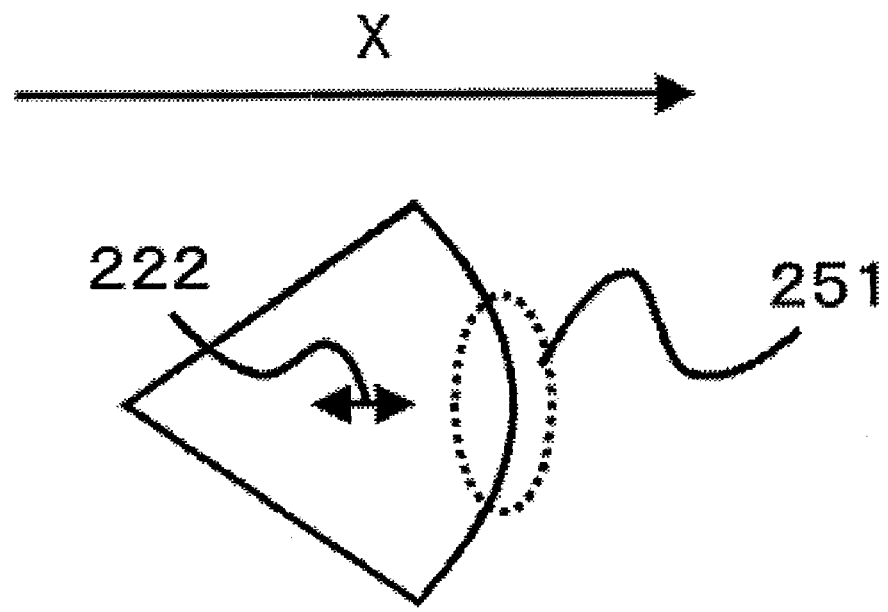
FIGS. 10A and 10B are views showing minute apertures other than triangular form.
Figure 10B:
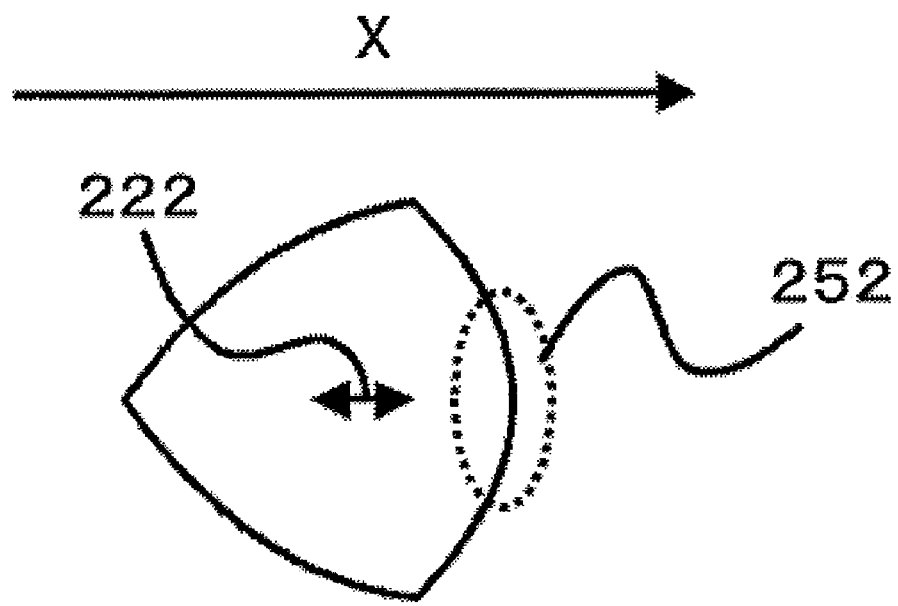

In the present embodiment, the aperture is shaped into a triangular form. Since this shape is formed by mask patterning, any desired aperture shape can be formed. It is to be noted, however, that the shape must have a contour having only one side that is perpendicular to the direction of polarization of the incident light. For instance, in FIG. 10(a), (b), minute apertures have shapes other than triangular form. In the shape of (a), the triangle has one side that is a curved line. The section or portion 251 that is perpendicular to the direction 222 of polarization of the incident light is the only location of the contour of the aperture where nearfield light is localized. Therefore, advantages similar to those produced in the case of a triangular aperture can be obtained. In the shape of (b), every side is a curved line. The section or portion 252 perpendicular to the direction 222 of polarization of the incident light is also the only location of the contour of the aperture where near-field light is localized. As shown, the contours of these apertures have no section extending inwardly toward the center of the apertures. Where the incident light having polarization as shown is directed to the apertures having these shapes, nearfield light localizes only in the section or portion substantially perpendicular to the the polarization of the incident light. Where this phenomenon is utilized, a high-resolution head producing a high signal intensity is obtained.

(Embodiment 2)

Figure 11:
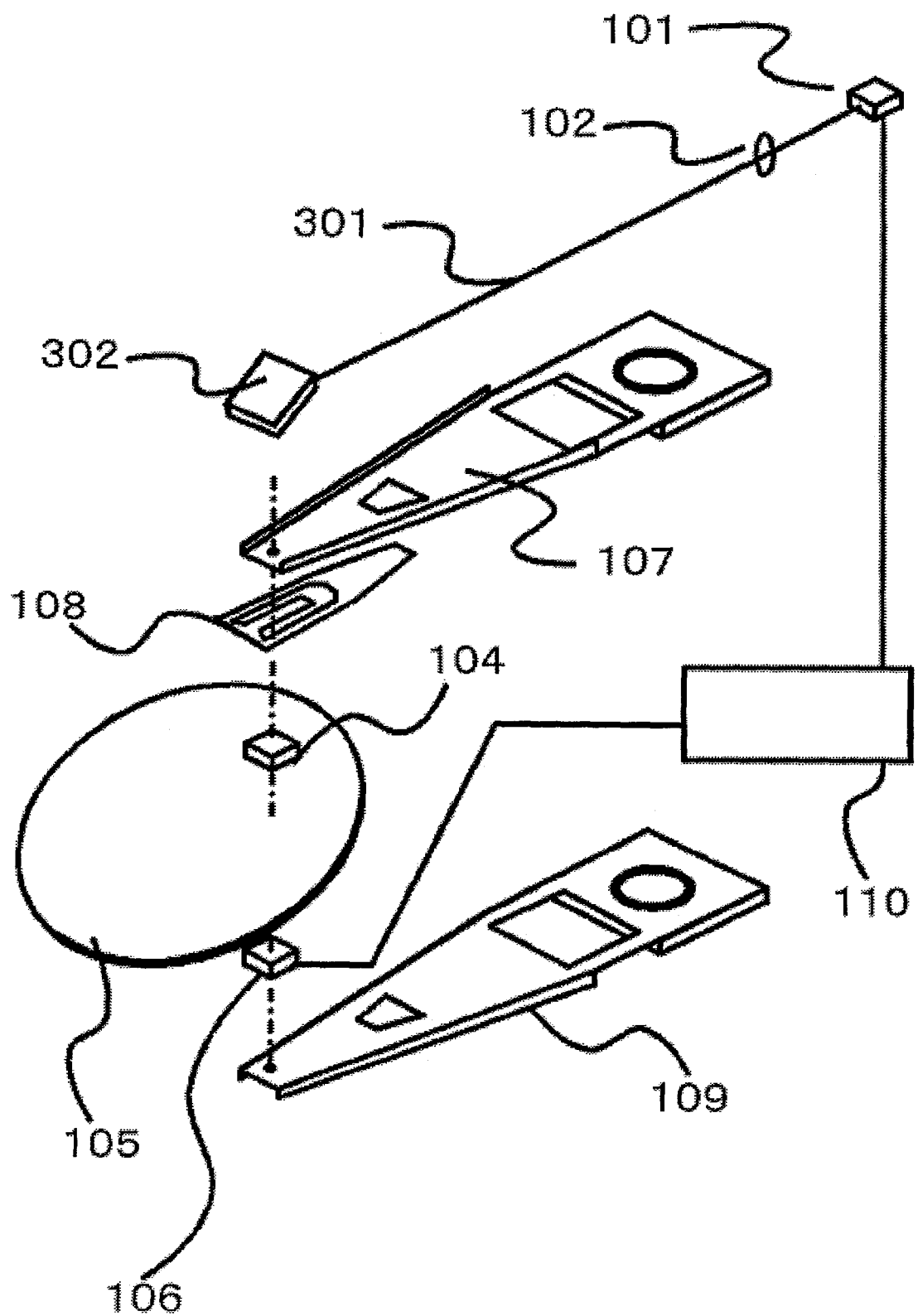
FIG. 11 is a view showing the configuration of an information recording-and-reading device according to embodiment 2 of the present invention.

FIG. 11 is a view showing the configuration of an information recording-and-reading device according to embodiment 2 of the present invention. Its main configurations are similar to those of FIG. 1 described in embodiment 1. Same components are indicated by same symbols. The difference is that in the present embodiment, a method of introducing light into a near-field optical head 104 consists of shaping light from a laser 101 into collimated light 301 using a lens 102, propagating the light through air, and bending the light vertically with a mirror 302. In other respects, the present embodiment is similar to embodiment 1 and thus description of these similar points will be omitted. In the present embodiment, light from the laser 101 is propagated through air and so the light can be admitted into the near-field optical head 104 while preserving the direction of polarization of the light. The important point of the present invention is that near-field light is localized by placing only the portion of the contour of the minute aperture forming the near-field light vertically to the polarization of the incident light. Among others, the present embodiment has the advantage that it can well control the polarization of the incident light. In consequence, information can be recorded and read at a high density with high S/N.

(Embodiment 3)

FIG. 12 is a view showing the vicinities of a minute aperture at the bottom surface of a near-field optical head used in an information recording-and-reading device according to embodiment 3 of the present embodiment. FIG. 12 is similar to FIG. 3 except that an Al light-shielding film 411 deposited on the surface of a triangular pyramid is shown in FIG. 12. One face of the three faces of the triangular pyramid is a Ag film 412 instead of Al. A $SiO_2$ or Al layer is deposited to about 100 nm on the surface of the Al light-shielding film 411 and the Ag film 412, although not shown. The front end of the triangular pyramid is cut horizontally to form an optically minute aperture 206.

FIG. 13 is a plan view of the minute aperture shown in FIG. 12. The minute aperture 206 has a substantially triangular contour. Its right side is substantially perpendicular to the direction of scan x of the head. The portion in contact with this side is the Ag film 412. The other two sides are made of Al film 411. Where light having the direction of polarization in the x-direction as shown is made to enter the near-field optical head having this structure, the surface of the Ag excites plasmons, so that near-field light localizes strongly on the surface of the Ag film. As a result, further localization and increase of the energy can be accomplished, in addition to the light-localizing effect possessed by the structure implemented in embodiment 1 or 2.

Figure 14:
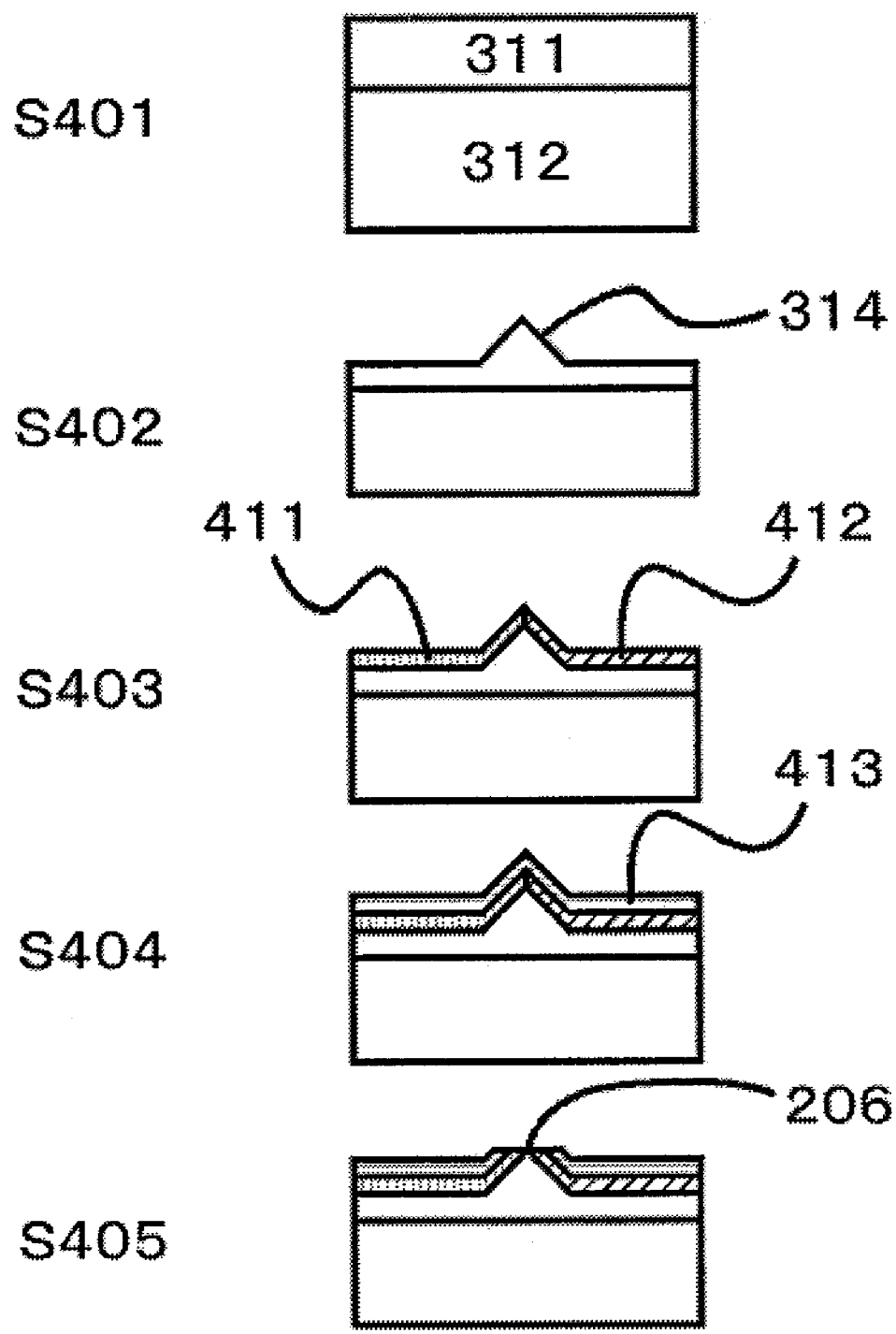
FIG. 14 is a view illustrating a method of fabricating a near-field optical head.

FIG. 14 illustrates a method of fabricating the near-field optical head of the present embodiment. In step S401, a $SiO_2$ layer 311 having a thickness of 15 microns is formed on the top surface of a Si substrate 312 having a thickness of 400 microns by plasma CVD. In step S402, a form 314 of a triangular pyramid is formed by isotropic etching, using a triangular mask patterned by photolithography. Then, in step S403, an Ag film 412 is formed on one face of the triangular pyramid form 314. An Al film 411 is formed on the other two faces. This can be easily accomplished by placing the substrate at an angle x to the evaporation source. In step S404, an Al film 413 is formed over the whole surface. Then, in step S405, the front end is cut to fabricate an optical aperture 206. As also described in embodiment 1, the optical aperture 206 can also be formed by a cutting operation making use of FIB. It can also be attained by applying mechanical force to the front end.

(Embodiment 4)

Figure 15:
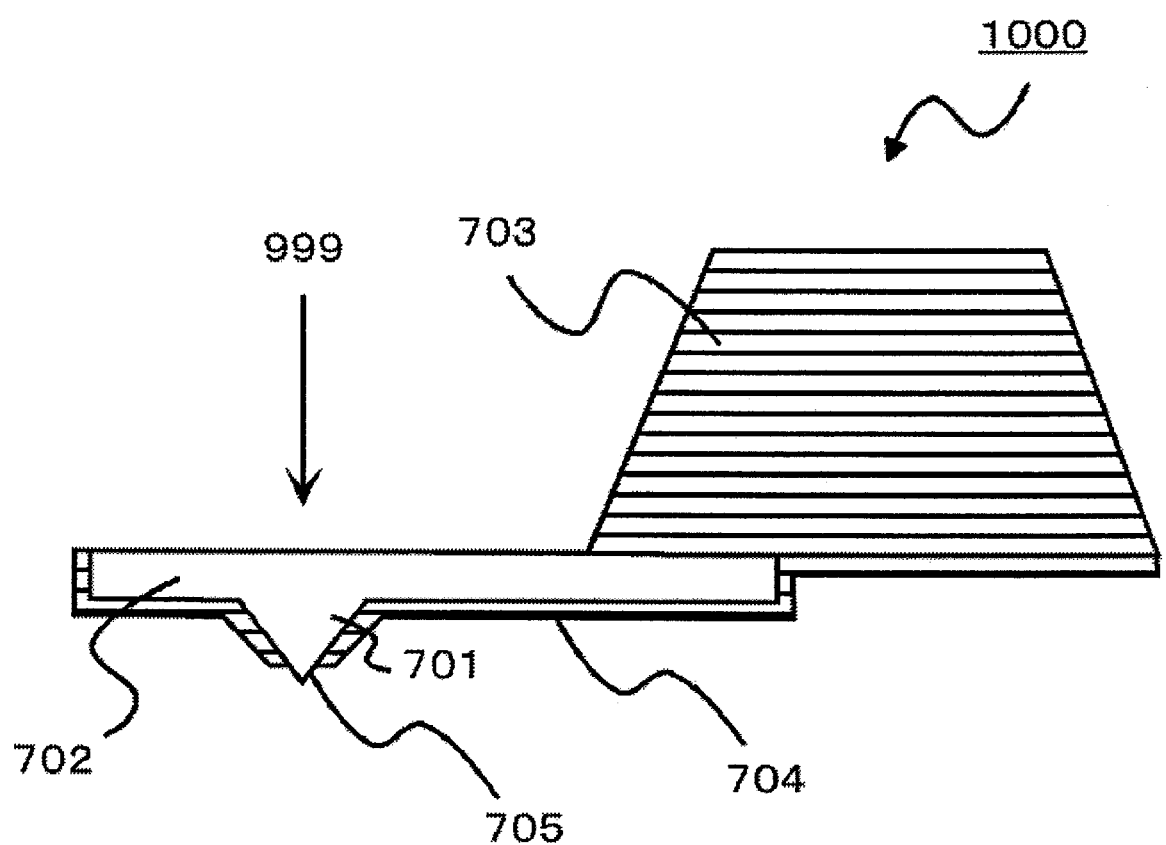
FIG. 15 is a schematic view of a near-field optical probe according to embodiment 4 of the invention.

FIG. 15 is a schematic view of a near-field optical probe 1000 according to embodiment 4. The near-field optical probe 1000 comprises a tip 701, a lever 702, a base portion 703, a light-shielding portion 704, and a minute aperture 705. The conical tip 701 and the lever 702 that is a cantilevered thin sheet are formed integrally. The tip 701 is formed on the lever 702 protruding straight from the base portion 703 and on a surface opposite to the base portion 703. The light-shielding film 704 is formed on the surface of the lever 702 opposite to the base portion 703 and on the surface of the tip 701. Although it is not necessary to form the light-shielding film 704 over the whole surface opposite to the base portion 703 of the lever 702, the film 704 is preferably formed over the whole surface.

The minute aperture 705 is free of the light-shielding film 704 over the tip 701. The vertex of the tip 701 protrudes from the end surface of the light-shielding film 704. The front end of the tip 701 may be flush with the end surface of the light-shielding film 704. The near-field optical probe 1000 can emit near-field light from the minute aperture 705 by introducing incident light 999 from the outside. Furthermore, optical information from a specimen can be detected owing to the minute aperture 705. In addition, illumination of the near-field light from the minute aperture 705 and detection of optical information about the specimen at the minute aperture can be performed simultaneously.

The tip 701 and lever 702 are made of a material transparent to the wavelength of incident light 999 used in a scanning near-field microscope. Where the wavelength of the incident light 999 is in the visible range, the material can be dielectric materials (such as silicon dioxide and diamond) and polymers typified by polyimide. Where the wavelength of the incident light 999 is in the UV range, the material of the tip 701 and lever 702 is a dielectric material such as magnesium difluoride or silicon dioxide. Where the wavelength of the incident light 999 is in the infrared region, the material of the tip 701 and lever 702 is zinc selenium or silicon. The material of the base portion 703 is a dielectric material such as silicon or silicon dioxide or a metal such as aluminum or titanium. The material of the light-shielding film 704 shows a high light-shielding factor for the incident light 999 and/or for the wavelength of light detected by the minute aperture 705 such as aluminum and gold. The height of the tip 701 is microns to tens of microns. The length of the lever 702 is tens of microns to thousands of microns. The thickness of the lever 702 is on the order of microns. The thickness of the light-shielding film 704 is tens of nanometers to hundreds of nanometers, though it varies according to the light-shield factor. With respect to the size and shape of the minute aperture 705 as viewed from the bottom surface of FIG. 15, it is a triangle inscribing a circle whose diameter is less than the wavelength of the incident light 999 and/or the light detected by the minute aperture 705.

At this time, the incident light 999 is linearly polarized light from a laser light source. Its direction of polarization is substantially perpendicular to one side of the triangular contour of the minute aperture 705.

Figure 16:
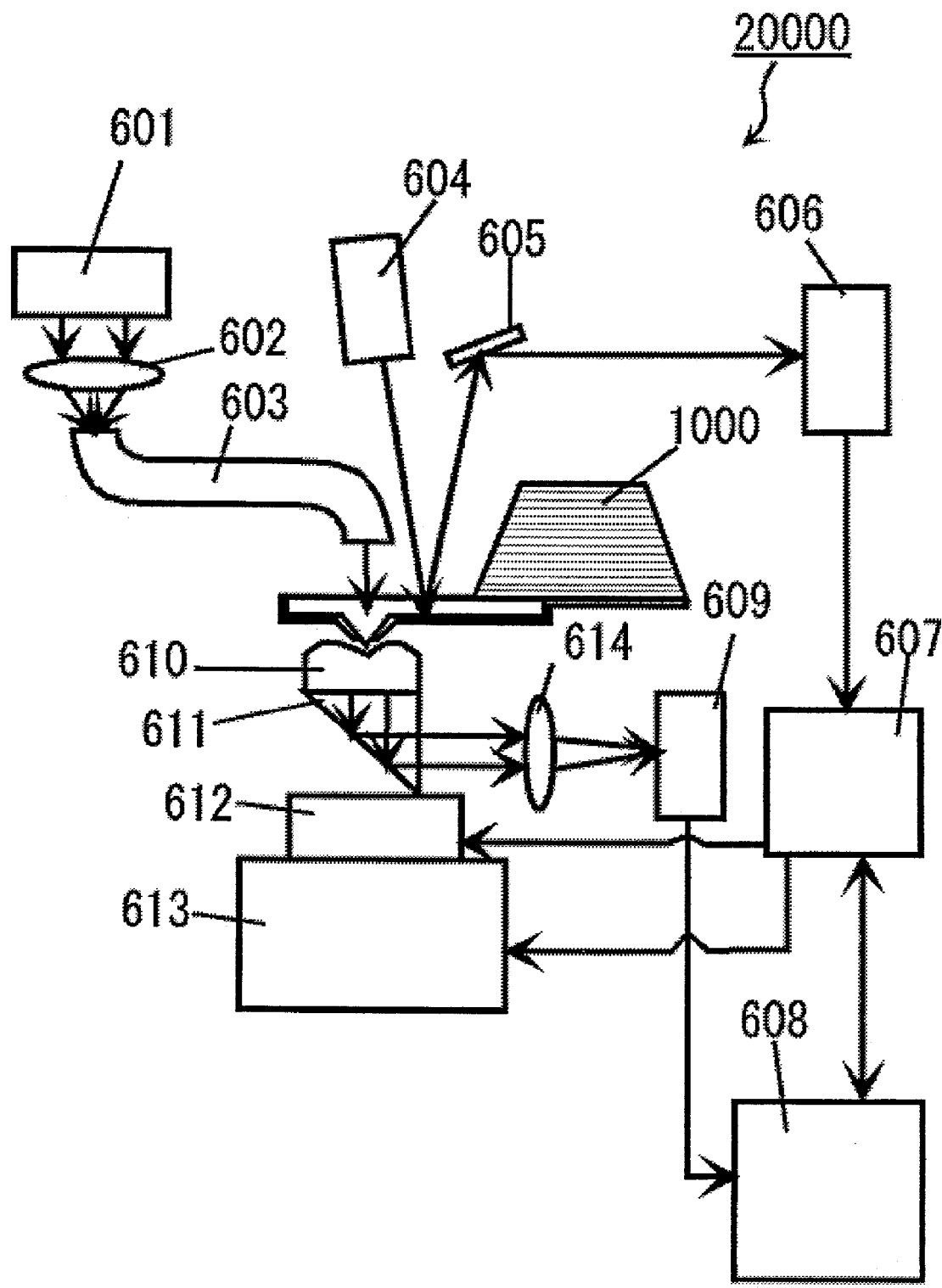
FIG. 16 is a view showing the configuration of a scanning probe microscope fitted with the near-field optical probe according to embodiment 4 of the invention.

FIG. 16 is a view showing the structure of a scanning probe microscope 20000 fitted with the near-field optical probe 1000 according to the embodiment 4 of the present invention. This scanning probe microscope 20000 comprises the near-field optical probe 1000 shown in FIG. 15, a light source 601 for measurement of optical information, a lens 602 placed in front of the light source 601, an optical fiber 603 for propagating light collected by the lens 602 to the near-field optical probe 1000, a prism 611 placed below a specimen 610 and reflecting propagating light produced at the front end of the tip, a lens 614 for collecting the propagating light reflected by the prism 611, and a light detection portion 609 for receiving the collected, propagating light. The optical fiber 603 is a polarization-maintaining fiber for preserving the direction of polarization of the incident light.

A laser generator 604 for producing laser light, a mirror 605 for reflecting the laser light reflected off the interface between the lever 702 of the near-field optical probe 1000 shown in FIG. 15 and the light-shielding film 704, and a photoelectric converter portion 606 for receiving the reflected laser light and performing a photoelectric conversion are mounted above the near-field optical probe 1000. The photoelectric converter portion 606 is vertically divided into two. Furthermore, there are provided a rough motion mechanism 613 and a fine motion mechanism 612 for moving and controlling a specimen 610 and a prism 611 in the X-, Y-, and Z-directions, a servo mechanism 607 for driving these rough motion mechanism 613 and fine motion mechanism 612, and a computer 608 for controlling the whole apparatus.

The operation of this scanning probe microscope 20000 is next described. Laser light emitted from the laser generator 604 is reflected off the interface between the lever 702 of the near-field optical probe 1000 shown in FIG. 15 and the light-shielding film 704. When the minute aperture 705 and the surface of the specimen 610 come closer to each other, the lever 702 of the near-field optical probe 1000 is distorted by the attraction or repulsion between the lever and the specimen 610. Therefore, the optical path of the reflected laser light varies. This is detected by the photoelectric converter portion 606.

The signal detected by the photoelectric converter portion 606 is sent to the servo mechanism 607. The servo mechanism 607 controls the rough motion mechanism 613 and the fine motion mechanism 612 such that the deflection of the near-field optical probe 1000 is kept constant, based on the signal detected by the photoelectric converter portion 606 when the near-field optical probe 1000 approaches the specimen 610 or the surface is observed. The computer 608 receives information about the surface topography from the control signal from the servo mechanism 607. Furthermore, the light emitted from the light source 601 is condensed by the lens 602 and reaches the optical fiber 603. The light propagating through the optical fiber 603 is admitted into the tip 701 of the near-field optical probe 1000 via the lever 702 while the polarization is maintained. The light is directed to the specimen 610 from the minute aperture 705. On the other hand, optical information about the specimen 610 reflected from the prism 611 is collected by the lens 614 and introduced into the light detection portion 609. The signal from the light detection portion 609 is gained via the analog input interface of the computer 608 and detected as optical information by the computer 608. The method of introducing light into the tip 701 may consist of collecting the light emitted from the light source 601 directly onto the tip 701 by a lens and admitting the light without using the optical fiber 603. In the description with reference to FIG. 16, an illumination mode has been described in which light is admitted into the near-field optical probe 1000 and near-field light is directed to the specimen from the minute aperture 705. The near-field optical probe 1000 can also be used in a collection mode in which near-field light produced at the surface of the specimen 610 is detected by the minute aperture 705. In addition, the near-field optical probe 1000 can be used in an observational method in which the illumination mode and the collection mode are simultaneously effected.

In FIG. 16, a transmission mode in which light transmitted through the specimen 610 is detected has been described.

The near-field optical probe 1000 can also be used in a reflection mode in which light reflected from the specimen 610 is detected. Additionally, the near-field optical probe 1000 can be used in a dynamic focus mode in which the lever 702 is vibrated by applying vibration to the near-field optical probe 1000 using a bimorph or the like and the distance between the tip 701 and the specimen 610 is controlled so as to maintain constant the variation in the amplitude of the lever 702 or frequency variation of the vibration of the lever 702 that is caused by the repulsion or attraction exerted between the tip 701 and the specimen 610.

Where the specimen surface is observed using the scanning probe microscope of the construction described above, a phenomenon similar to that described in embodiment 1 occurs. That is, near-field light is strongly localized near one side of the minute aperture because the direction of polarization of the incident light is substantially perpendicular to the one side of the minute aperture. Consequently, it strongly interacts with a microscopic area on the specimen surface. An observation at high resolution and high S/N is made possible. Similar advantages can be obtained if the minute aperture is substantially triangular as described in embodiment 1 or shapes shown in FIGS. 10(a),(b). The main point is that the portion of the contour of the minute aperture which is substantially perpendicular to the direction of polarization of the incident light is localized in one portion.

Figure 17A:
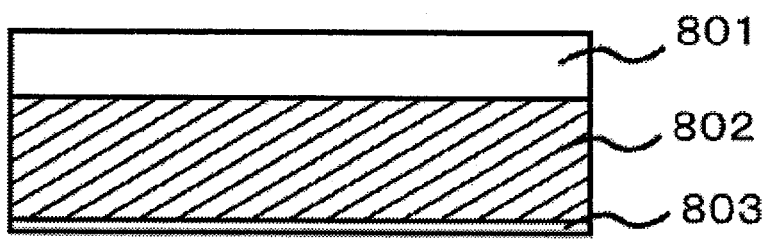
FIGS. 17A–17B are views illustrating a method of fabricating a near-field optical probe 1000 of embodiment 4 of the invention.

FIGS. 17 and 18 illustrate a method of fabricating the near-field optical probe 1000 of embodiment 4 of the present invention. FIG. 17(a) shows a state in which a transparent body 801 becoming a tip 701 and a lever 702 is deposited on a substrate 802. In the description given below, the top of each figure is referred to as the front surface, while the bottom portion is referred to as the rear surface. The transparent body 801 is deposited by plasma CVD or sputtering on the substrate 802 having a masking material 803 on the rear surface. The amount of the deposited transparent body 801 is about equal to or slightly greater than the sum of the height of the tip 701 and the thickness of the lever 702.

Figure 17B:
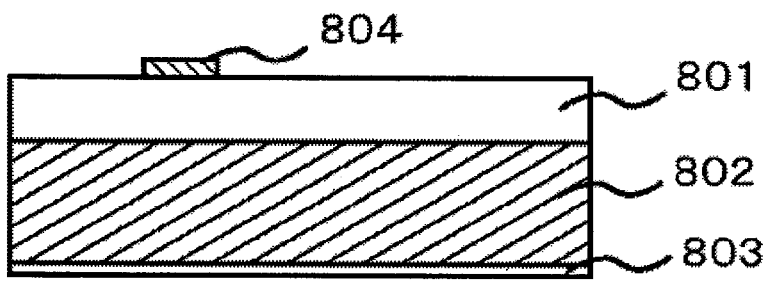
Figure 17C:
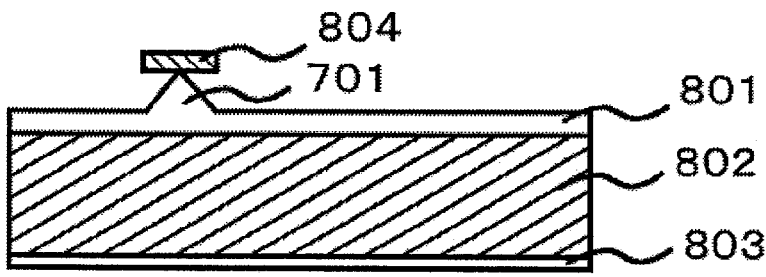

After depositing the transparent body 801, a mask 804 for the tip is formed on the transparent body 801 by a method typified by photolithography as shown in FIG. 17(b). The mask 804 for the tip is a dielectric material such as photoresist or polyimide. After forming the mask 804 for the tip, the tip 701 is formed as shown in FIG. 17(c) by isotropic etching such as wet etching or dry etching.

Figure 18A:
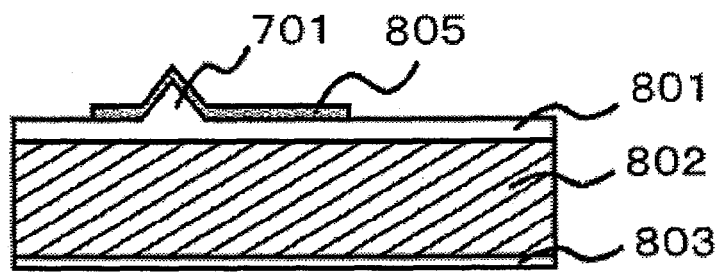
FIGS. 18A–18D are views illustrating a method of fabricating a near-field optical probe 1000 of embodiment 4 of the invention.
Figure 18B:
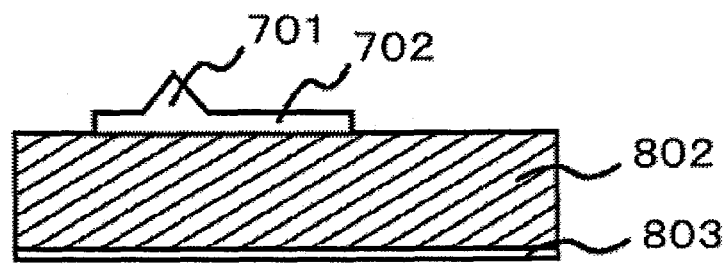

After forming the tip 701, a mask 805 for the lever is formed on the transparent body 801 as shown in FIG. 18(a). After forming the mask 805 for the lever, a lever 702 is formed as shown in FIG. 18(b) by anisotropic dry etching typified by reactive ion etching (RIE).

Figure 18C:
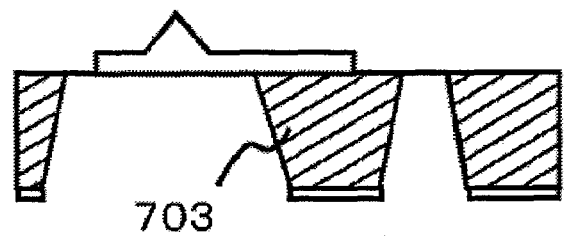
Figure 18D:
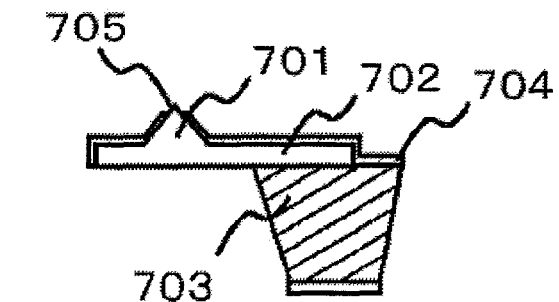

After forming the lever 702, the masking material 803 is patterned by photolithography. Then, the lever 702 is released and the base portion 703 is formed as shown in FIG. 18(c) by crystal anisotropic etching using tetramethyl ammonium hydroxide (TMAH) or potassium hydroxide (KOH) or anisotropic dry etching. Finally, a light-shielding film 704 is deposited on the front surface. Undesired portions of the light-shielding film 704 are removed by a focused ion beam or pressing the tip 701 against the specimen during observation. As shown in FIG. 18(d), a minute aperture 705 is formed, and the near-field optical probe 1000 can be obtained.

(Embodiment 5)

Figure 19:
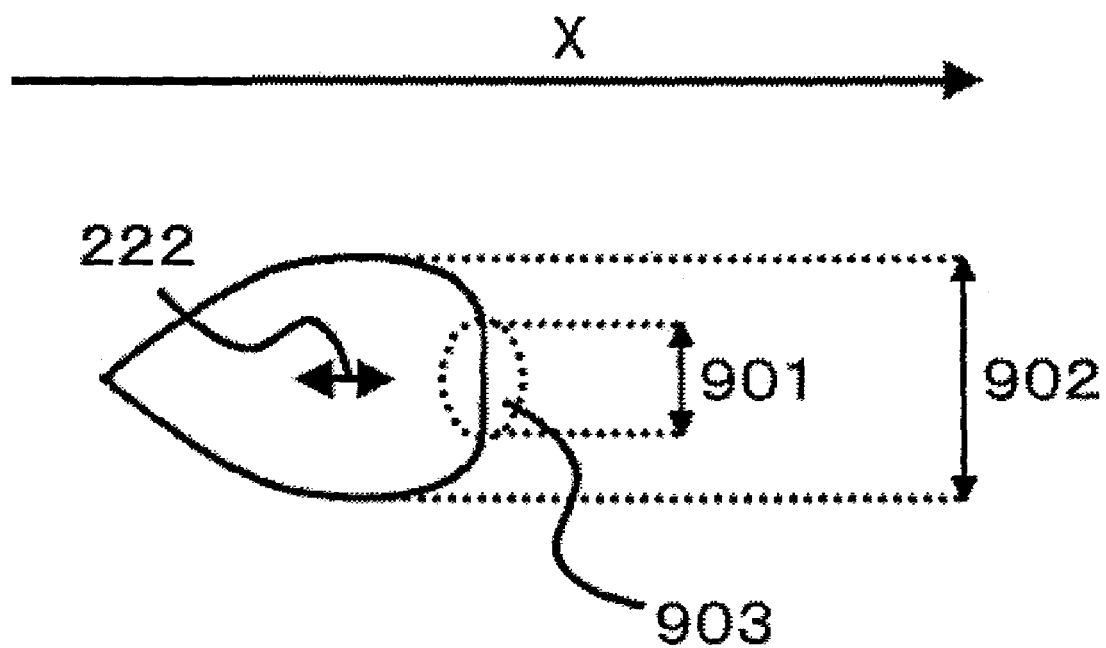
FIG. 19 is a view showing the shape of a minute aperture in a near-field optical probe according to embodiment 5 of the invention.

FIG. 19 shows the shape of the minute aperture of a near-field light-generating element according to embodiment 5 of the present invention. Incident light polarization 222 is parallel to x-direction. The length 901 of the portion of the contour of the minute aperture which is substantially perpendicular to the incident light polarization 222 is shorter than the vertical width 902 of the aperture. As mentioned previously, near-field light distribution 903 localizes in the portion substantially perpendicular to the incident light polarization 222. In this embodiment, the near-field light distribution 903 localizes vertically more narrowly than the vertical width 902 of the minute aperture. The near-field light can be localized vertically as well as in the left and right directions in the figure by the combination of the minute aperture of this shape and the incident light polarization.

Where this near-field light-generating element is used as a head of an optical recording device, the recording density in the track direction can be improved, as well as the density of the linear direction. Furthermore, where this near-field light-generating element is used as a probe in a near-field optical microscope, a near-field optical microscope having high resolution in every direction within the specimen surface can be accomplished.

(Embodiment 6)

Figure 20:
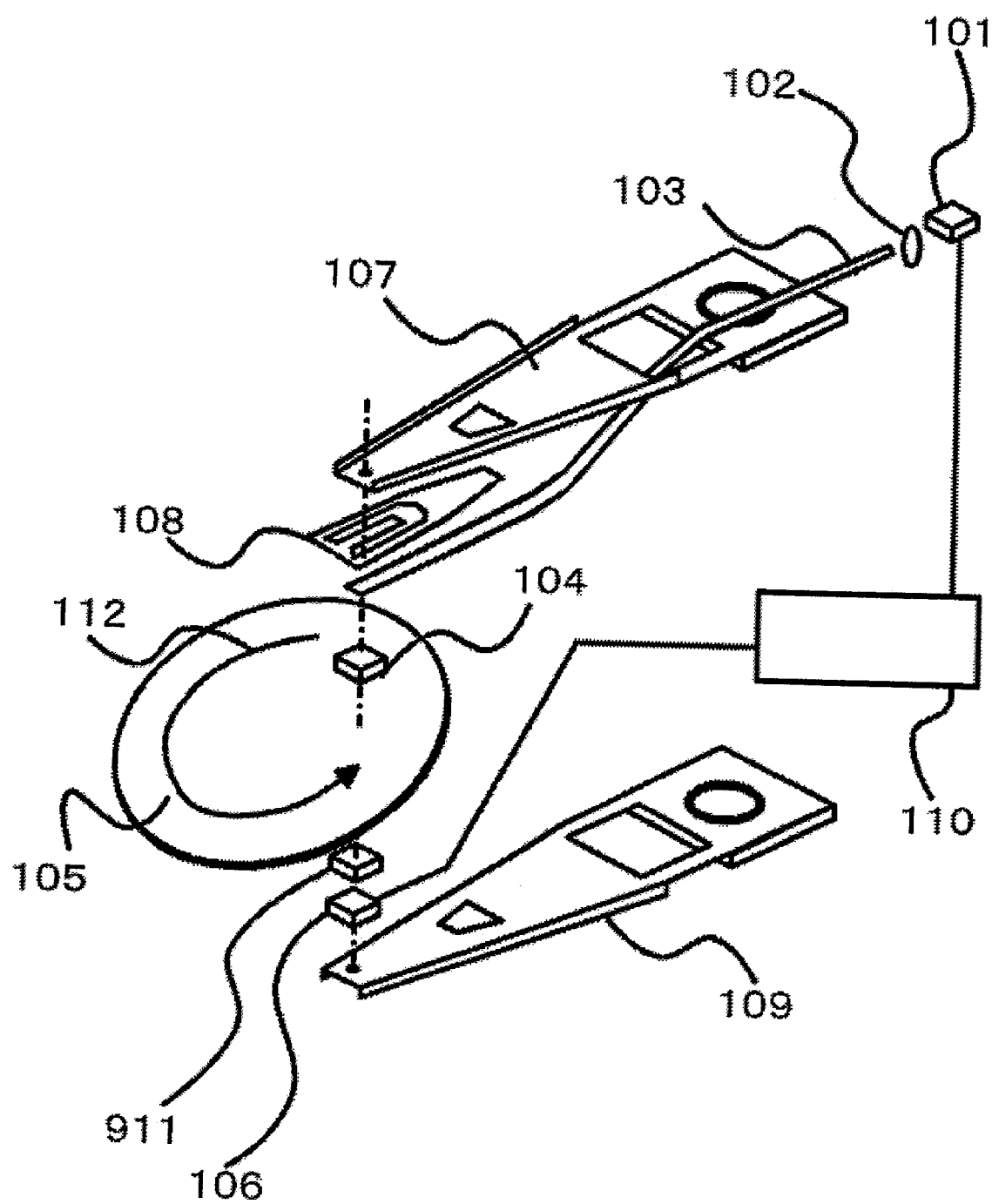
FIG. 20 is a view illustrating the configuration of a near-field optical recording device making use of a near-field optical-generating element according to embodiment 6 of the invention as a head.

FIG. 20 is a view illustrating the configuration of a near-field optical recording device that makes use of the near-field light-generating element according to embodiment 6 of the present invention as a head. The configuration is similar to FIG. 1 described in embodiment 1. Same components are indicated by same reference numerals, and their description is omitted. The difference with FIG. 1 is that a polarizing plate 911 is inserted in a portion that detects scattered light. The scattered light is produced by interaction between a near-field optical head 104 and a recording medium 105 via near-field light. Only a certain polarized component is taken from the scattered light by the polarizing plate 911 and received by a light-receiving head 106. In the present invention, the direction of polarization relative to the near-field optical head 104 is controlled to enter the light. Interaction with the recording medium 105 disturbs the polarized light. This disturbance depends on data mark that is a minute optical characteristic difference on the surface of the recording medium 105. A high-contrast signal reproduction can be performed by selectively detecting it. In consequence, recording and reading can be performed at a still higher density.

Since the polarizing plate is mounted on the detection side in this way, similar advantages can be obtained where a near-field light-generating element is used as a probe in a near-field optical microscope in a manner not illustrated. In the case of a microscope, the resolution can be enhanced.

(Embodiment 7)

FIG. 21 is a view illustrating the manner in which a near-field light-generating element according to embodiment 7 of the present invention is used in a probe of a near-field optical microscope. FIG. 21(a) is a side elevation, and (b) is a plan view of an aperture. In FIG. 21(a), a cantilever 921 has a triangular pyramid 922 near its front end, the pyramid being made of SiO$_2$. Its front end is cut parallel to the cantilever 921, whereby an optically small aperture is formed. In (b), incident light is a linearly polarized light in the left and right directions in the figure. A side 924 substantially vertical to the direction of polarization 928 has a height 925 above a specimen surface 923. This height 925 is lower than a height 926 of a vertex 927 taken from the specimen surface 923. As mentioned previously, in the present invention, near-field light localizes on the side 924 substantially vertical to the incident light polarization 928. In the present embodiment, this portion is brought closer to the specimen. This improves the resolution. Also, the signal intensity and S/N are enhanced.

(Embodiment 8)

FIG. 22 is a view illustrating the manner in which a near-field light-generating element according to embodiment 8 of the present invention is used in a probe of a near-field optical microscope. The configuration of the present embodiment is similar to that of embodiment 7. One difference is that the optically small aperture has rotated through 90° relative to a cantilever 921. Another difference is that the direction of polarization 928 of the incident light is vertical direction in the figure. A side 931 substantially perpendicular to the direction of polarization 928 is tilted relative to a specimen surface 923. The height 925 of the left end 932 of this side 931 above the specimen surface 923 is lower than the height 926 of the right end 933. As mentioned previously, near-field light localizes near the side 931 vertical to the incident light polarization 928. The left end 932 of this near-field light distribution is closer to the specimen surface 923 than the right end 933. Since the near-field light spatially attenuates exponentially toward the specimen surface 923, the near-field light near the right end 933 does not strongly interact with the specimen surface 923. Only the near-field light near the left end 932 interacts with the specimen surface 923. In the past, the resolution has been determined by the size of the optical aperture. In the present invention, the resolution is determined by the length of one side of the aperture. Furthermore, in the present embodiment, the resolution is determined by one end of that side. Hence, the resolution can be enhanced further.

Figure 23:
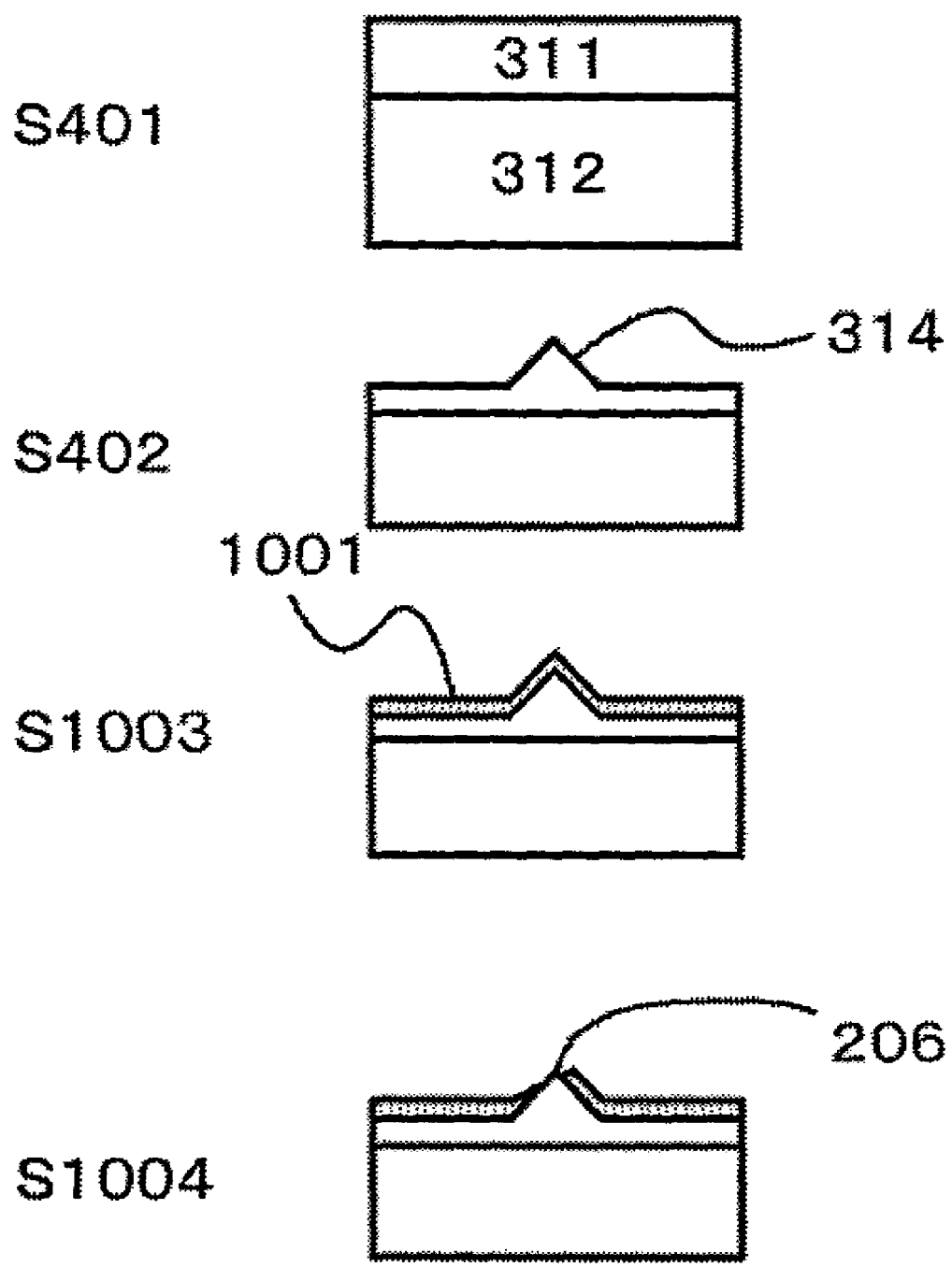
FIG. 23 is a view illustrating a method of fabricating a near-field optical head of the present embodiment.

A structure similar to embodiment 7 or 8 can also be used in a head of a near-field recording device. FIG. 23 illustrates a method of fabricating a near-field optical head of the present embodiment. Embodiment 3 is similar to the fabrication method illustrated in FIG. 14. Identical parts are indicated by identical symbols. In step S401, a SiO$_2$ layer 311 having a thickness of 15 microns is formed on the top surface of a Si substrate 312 having a thickness of 400 microns by plasma CVD. In step S402, a shape 314 of triangular pyramid is formed by isotropic etching, using a triangular-shaped mask patterned by photolithography. Then, in step S1003, an Al film 1001 is formed on the form 314 of a triangular pyramid. In step S1004, the front end of the triangular pyramid is cut by FIB to form an aperture 206. At this time, the end is cut obliquely to the substrate instead of parallel to it. In this way, the aperture of the shape described in embodiment 7 and 8 is formed.

As described thus far, a near-field light-generating element according to the present invention has an optically small aperture of a size smaller than the wavelength of incident light, the near-field light-generating element being designed to produce near-field light by directing the incident light to the optically small aperture. The near-field light-generating element is characterized in that one location of the contour of the small aperture is substantially perpendicular to the direction of polarization of the incident light.

Thus, only the portion of the contour of the small aperture which is substantially perpendicular to the direction of polarization of the incident light produces near-field light of high intensity. Consequently, a high resolution and a high light efficiency are compatible.

In one feature of the near-field light-generating element, the contour is a polygon having one side that is substantially perpendicular to the direction of polarization.

As a result, a high-performance near-field optical head can be fabricated economically simply by fabricating a mask of a simple shape. Furthermore, the portion of the contour of the aperture which produces strong near-field light is only one. This permits improvement of the resolution.

In another feature of the near-field light-generating element, the contour has a triangle having one side that is substantially perpendicular to the direction of polarization.

This permits fabrication of a minute aperture based on a triangular shape whose vertex can be readily formed. Stable near-field light-generating elements can be fabricated at high yield.

As one feature of the near-field light-generating element, the minute aperture is formed at the front end of a conical tip that transmits light. Surroundings of the minute aperture are covered with a light-shielding film.

This yields the advantage that it is possible to form a minute aperture having a size smaller than a structure capable of being fabricated by lithography.

As another feature of the near-field light-generating device, one side of the contour is made of a material that excites plasmons by incident light.

This presents the advantage that the generated near-field light strongly localizes near the one side of the minute aperture and so the near-field light-generating element has a high S/N and corresponds to high-density recording.

In a further feature, the material includes any of gold, silver, and copper.

This makes it possible to fabricate a high-performance near-field light-generating element by easy fabrication processes.

In a still further feature, the length of one location of the contour which is substantially perpendicular to the direction of polarization is shorter than the width of the aperture in a direction vertical to the polarization.

This results in the advantage that a near-field light-emitting element having high resolution in a direction vertical to the direction of polarization as well as in the direction of polarization can be accomplished.

In addition, a near-field optical recording device is provided which comprises an optical head, a light source, a recording medium, means for scanning the optical head across a surface of the recording medium, optical incident means for guiding incident light from the light source to the optical head, and optical detection means for detecting scattered light produced by interaction of the optical head with the surface of the recording medium via near-field light. The device is characterized in that the optical incident means includes means for keeping or controlling polarization of the incident light and in that the optical head is a near-field light-generating element set forth in any one of the above descriptions.

In consequence, the portion of the contour of the aperture that produces strong near-field light is only one and, therefore, the resolution can be enhanced. Furthermore, a high-performance near-field optical head can be fabricated by a simple method economically. In addition, in a data storage device, high-density recording and high transfer rate are compatible.

Further, a near-field optical microscope is provided which comprises an optical probe, a light source, optical incident means for guiding incident light from the light source to the optical probe, and optical detection means for detecting scattered light produced by interaction of the optical probe with the surface of the specimen via near-field light. The microscope is characterized in that the optical incident means includes means for keeping or controlling polarization of the incident light and in that the optical probe is a near-field light-generating element set forth in any one of the above descriptions.

Thus, only the portion of the contour of the minute aperture which is substantially perpendicular to the direction of polarization of the incident light produces near-field light of high intensity. High resolution and high light efficiency are compatible. Hence, high resolution and high S/N of the microscope can be accomplished. A high-performance near-field optical probe can be economically manufactured by a simple method.

In a yet other feature, the optical detection means includes a polarizing optical element.

As a consequence, microscopic distribution of an optical property on the surface of a recording medium or specimen surface can be detected as a disturbance to the polarization and thus a recording device of higher density or a microscope of higher resolution can be accomplished.

In a still other feature, one location of the contour of the minute aperture which is substantially perpendicular to the direction of polarization of the incident light is located closer to the front end than other portions of the contour in the optical probe.

This yields the advantage that the produced near-field light can be brought closer to the specimen surface and thus a high-resolution microscope can be accomplished.

In an additional feature, a line connecting one location of the contour of the minute aperture substantially perpendicular to the direction of polarization of the incident light and a portion opposite thereto is substantially perpendicular to the direction of the front end of the optical probe in the optical probe.

This creates the advantage that only a part of the near-field light that is localized can be utilized. Hence, a microscope of still higher resolution can be accomplished.

What is claimed is:

1. A near-field light-generating element having only one minute aperture having a size smaller than the wavelength of incident light for producing near-field light in response to incident light directed thereto, the minute aperture having a contour in a given plane, the contour having only one section extending along a line substantially perpendicular to a direction of polarization of the incident light so that near-field light is localized at only the one section of the contour of the aperture and having an opposite section opposite to the one section and not extending along a line perpendicular to the direction of polarization of the incident light.

2. A nearfield light-generating element according to claim 1; wherein the contour of the minute aperture is a polygon having one side that corresponds to the one section of the contour and that is substantially perpendicular to the direction of polarization.

3. A near-field light-generating element according to claim 1; wherein the contour is a triangle having one side that corresponds to the one section of the contour and that is substantially perpendicular to the direction of polarization.

4. A near-field light-generating element according to claim 1; wherein the minute aperture is formed at the front end of a projection for transmitting light, and wherein portions of the projection surrounding the minute aperture are covered with a light-shielding film.

5. A near-field light-generating element according to claim 2; wherein the minute aperture is formed at the front end of a projection for transmitting light, and wherein portions of the projection surrounding the minute aperture are covered with a light-shielding film.

6. A near-field light-generating element according to claim 3; wherein the minute aperture is formed at the front end of a projection for transmitting light, and wherein portions of the projection surrounding the minute aperture are covered with a light shielding film.

7. A near-field light-generating element according to claim 1; wherein the one section of the contour is made of a material that excites plasmons when irradiated by the incident light.

8. A near-field light-generating element according to claim 2; wherein the one section of the contour is made of a material that excites plasmons when irradiated by the incident light.

9. A nearfield light-generating element according to claim 3; wherein the one section of the contour is made of a material that excites plasmons when irradiated by the incident light.

10. A near-field light-generating element according to claim 4; wherein the one section of the contour is made of a material that excites plasmons when irradiated by the incident light.

11. A near-field light-generating element according to claim 5; wherein one section of the contour is made of a material that excites plasmons when irradiated by the incident light.

12. A near-field light-generating element according to claim 6; wherein the one section of the contour is made of a material that excites plasmons when irradiated by the incident light.

13. A near-field light-generating element according to claim 7; wherein the material includes at least one of gold, silver, and copper.

14. A near-field light-generating element according to claim 8; wherein the material includes at least one of gold, silver, and copper.

15. A near-field light-generating element according to claim 9; wherein the material includes at least one of gold, silver, and copper.

16. A near-field light-generating element according to claim 10; wherein the material includes at least one of gold, silver, and copper.

17. A near-field light-generating element according to claim 11; wherein the material includes at least one of gold, silver, and copper.

18. A near-field light-generating element according to claim 12; wherein the material includes at least one of gold, silver, and copper.

19. A near-field light-generating element according to claim 1; wherein the one section of the contour substantially perpendicular to the direction of polarization has a length shorter than a width of the minute aperture in the given plane in a direction perpendicular to the direction of polarization.

20. A near-field optical recording device comprising: an optical head comprising a near-field light-generating element according to claim 1; a light source; a recording medium; means for scanning the optical head across a surface of the recording medium; optical guide means for guiding incident light from the light source to the optical head and for keeping or controlling the polarization of the incident light; and optical detection means for detecting scattered light produced by interaction of the optical head with the surface of the recording medium via nearfield light.

21. A near-field optical microscope comprising: an optical probe comprising a near-field light-generating element according to claim 1; a light source; optical guide means for guiding incident light from the light source to the optical probe and for keeping or controlling polarization of the incident light; and optical detection means for detecting scattered light produced by interaction of the optical probe with the surface of a specimen via near-field light.

22. A near-field optical recording device according to claim 20; wherein the optical detection means includes a polarizing optical element.

23. A near-field optical microscope according to claim 21; wherein the optical detection means includes a polarizing optical element.

24. A near-field optical microscope according to claim 21; wherein the one section of the contour of the minute aperture substantially perpendicular to the direction of polarization of incident light is located closer to a front end than a rear end of the optical probe.

25. A near-field optical microscope according to claim 23; wherein the one section of the contour of the minute aperture substantially perpendicular to the direction of polarization of incident light is located closer to a front end than a rear end of the optical probe.

26. A near-field optical microscope according to claim 21; wherein a line connecting the one section of the contour of the minute aperture substantially perpendicular to the direction of polarization of the incident light and a section opposite thereto is substantially perpendicular to the direction of a front end of the optical probe.

27. A near-field optical microscope according to claim 23; wherein a line connecting the one section of the contour of the minute aperture substantially perpendicular to the direction of polarization of the incident light and a section opposite thereto is substantially perpendicular to the direction of a front end of the optical probe.

28. A near-field light-generating element according to claim 1; wherein the contour of the aperture has no section extending inwardly towards the center of the aperture.

29. A near-field light-generating element according to claim 1; wherein the one section of the contour of the aperture extends continuously without interruption by any other section of the contour.

30. A near-field light-generating element according to claim 1; wherein the given plane is perpendicular to the direction of incident light.

31. A near-field light-generating element having only one minute aperture having a size smaller than a wavelength of incident light for producing near-field light in response to the incident light, a contour of the minute aperture in a given plane having only one section which is substantially perpendicular to a direction of polarization of the incident light in the given plane so that near-field light is localized at only the one section of the contour of the aperture and having another section opposite the one section and which is not perpendicular to the direction of polarization of the incident light in the given plane.

32. A near-field light-generating element according to claim 31; wherein the contour of the minute aperture in the given plane is polygonal.

33. A near-field light-generating element according to claim 32; wherein the minute aperture is formed at a terminal end of a projection for transmitting light to the minute aperture, the projection being covered by a light-shielding film except for the minute aperture.

34. A near-field light-generating element according to claim 33; wherein one side of the projection is comprised of a material that excites plasmons in response to the incident light.

35. A near-field light-generating element according to claim 34; wherein the material comprises at least one of gold, silver and copper.

36. A near-field light-generating element according to claim 33; wherein the one section of the minute aperture is comprised of a material that excites plasmons in response to the incident light.

37. A near-field light-generating element according to claim 36; wherein the material comprises at least one of gold, silver and copper.

38. A near-field light-generating element according to claim 31; wherein the contour of the minute aperture in the given plane is triangular, and one side of the triangle corresponds to the one section of the contour and lies along a line substantially perpendicular to the direction of polarization of the incident light.

39. A near-field light-generating element according to claim 38; wherein the minute aperture is formed at a terminal end of a triangular pyramid-shaped projection for transmitting the incident light to the minute aperture, and the projection is covered with a light-shielding film except for the minute aperture.

40. A near-field light-generating element according to claim 39; wherein one side of the projection is comprised of a material that excites plasmons in response to the incident light.

41. A near-field light-generating element according to claim 40; wherein the material includes at least one of gold, silver and copper.

42. A near-field light-generating element according to claim 31; wherein the one section of the minute aperture has a length that is shorter than a width of the minute aperture in a direction perpendicular to the direction of polarization of the incident light in the given plane.

43. A near-field light-generating element according to claim 31; wherein the contour of the aperture has no section extending inwardly towards the center of the aperture.

44. A near-field light-generating element according to claim 31; wherein the one section of the contour of the aperture extends continuously without interruption by any other section of the contour.

45. A near-field light-generating element according to claim 31; wherein the given plane is perpendicular to the direction of incident light.

46. A near-field optical recording apparatus comprising: an optical head having only one a minute aperture for generating nearfield light, the minute aperture having a contour in a given plane that has only one section which is perpendicular to a direction of polarization of incident light so that the near-field light is localized at only the one section of the contour of the aperture and having an opposite section that is not perpendicular to the direction of polarization of incident light; a light source for producing the incident light; a recording medium; means for scanning the optical head across a surface of the recording medium; an optical waveguide for guiding incident light from the light source to the optical head and controlling the direction of polarization of the incident light; and optical detection means for detecting scattered light produced by interaction of the optical head with the surface of the recording medium via near-field light.

47. A near-field optical recording apparatus according to claim 46; wherein the minute aperture is formed at the front end of a projection for transmitting light, and wherein portions of the projection surrounding the minute aperture are covered with a light-shielding film.

48. A near-field optical recording apparatus according to claim 47; wherein the contour is a triangle having one side that corresponds to the one section of the contour and that is substantially perpendicular to the direction of polarization of the incident light, and a point joining two other sides of the triangle located opposite the one side.

49. A near-field optical recording apparatus according to claim 46; wherein the contour of the aperture has no section extending inwardly towards the center of the aperture.

50. A near-field optical recording apparatus according to claim 46; wherein the one section of the contour of the aperture extends continuously without interruption by any other section of the contour.

51. A near-field optical recording apparatus according to claim 46; wherein the given plane is perpendicular to the direction of incident light.

* * * * *